(12) United States Patent
Lim

(10) Patent No.: US 9,509,645 B2
(45) Date of Patent: Nov. 29, 2016

(54) MOBILE TERMINAL, MESSAGE TRANSCEIVING SERVER AND CONTROLLING METHOD THEREOF

(71) Applicant: LG ELECTRONICS INC., Seoul (KR)

(72) Inventor: Sungjin Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 14/142,031

(22) Filed: Dec. 27, 2013

(65) Prior Publication Data

US 2014/0184544 A1    Jul. 3, 2014

(30) Foreign Application Priority Data

Dec. 28, 2012 (KR) .................. 10-2012-0156733
Mar. 15, 2013 (KR) .................. 10-2013-0027973

(51) Int. Cl.
*H04L 12/58*    (2006.01)
*G06F 3/0488*    (2013.01)

(52) U.S. Cl.
CPC ........... *H04L 51/066* (2013.01); *G06F 3/0488* (2013.01); *H04L 51/18* (2013.01)

(58) Field of Classification Search
None
See application file for complete search history.

(56) References Cited

U.S. PATENT DOCUMENTS

| | | | |
|---|---|---|---|
| 2008/0055269 A1* | 3/2008 | Lemay et al. | 345/173 |
| 2011/0258559 A1* | 10/2011 | You et al. | 715/752 |
| 2013/0067392 A1* | 3/2013 | Leonard et al. | 715/784 |
| 2013/0080964 A1* | 3/2013 | Shigeta | 715/773 |
| 2013/0179800 A1* | 7/2013 | Jeong et al. | 715/752 |
| 2013/0238651 A1* | 9/2013 | Benedek et al. | 707/769 |
| 2014/0059448 A1* | 2/2014 | Lee | H04L 51/00 715/752 |
| 2015/0074555 A1* | 3/2015 | Yoon et al. | 715/753 |

\* cited by examiner

*Primary Examiner* — David D Davis
(74) *Attorney, Agent, or Firm* — Birch, Stewart, Kolasch & Birch, LLP

(57) ABSTRACT

A mobile terminal can include a wireless communication unit for transceiving messages with another terminal, and a touchscreen for displaying the messages in an order in which the messages were transceived. Also, the mobile terminal can include a controller for receiving a selection of a first message displayed at a first position among the transceived messages, moving the selected first message to a different position on the touchscreen of mobile terminal such that the transceived messages are displayed in an order different from the order in which they were transceived, and transmitting a message rearrangement command to the other terminal for rearranging messages displayed on a touchscreen of the other terminal in an order different from the order in which they were transceived.

24 Claims, 30 Drawing Sheets

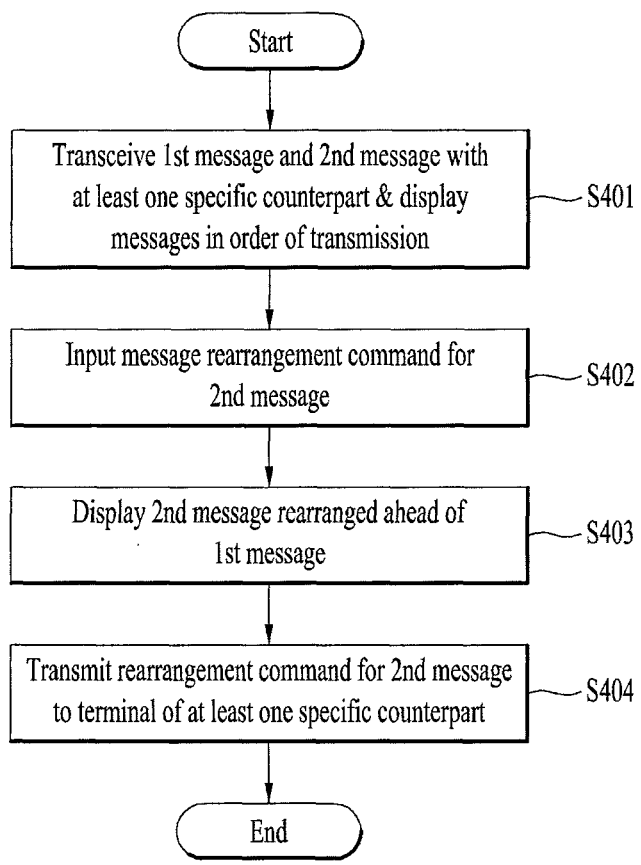

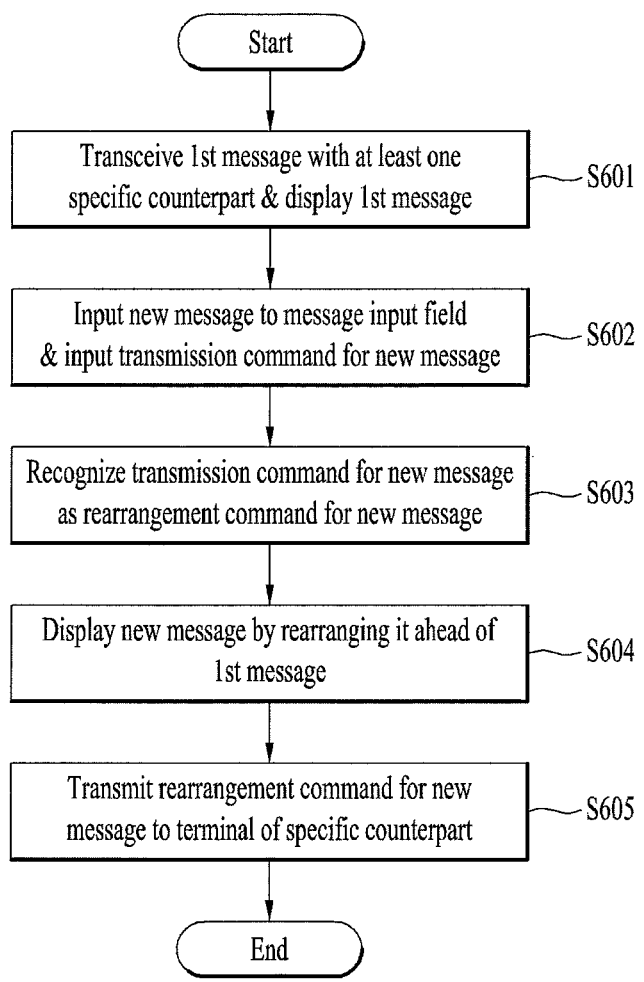

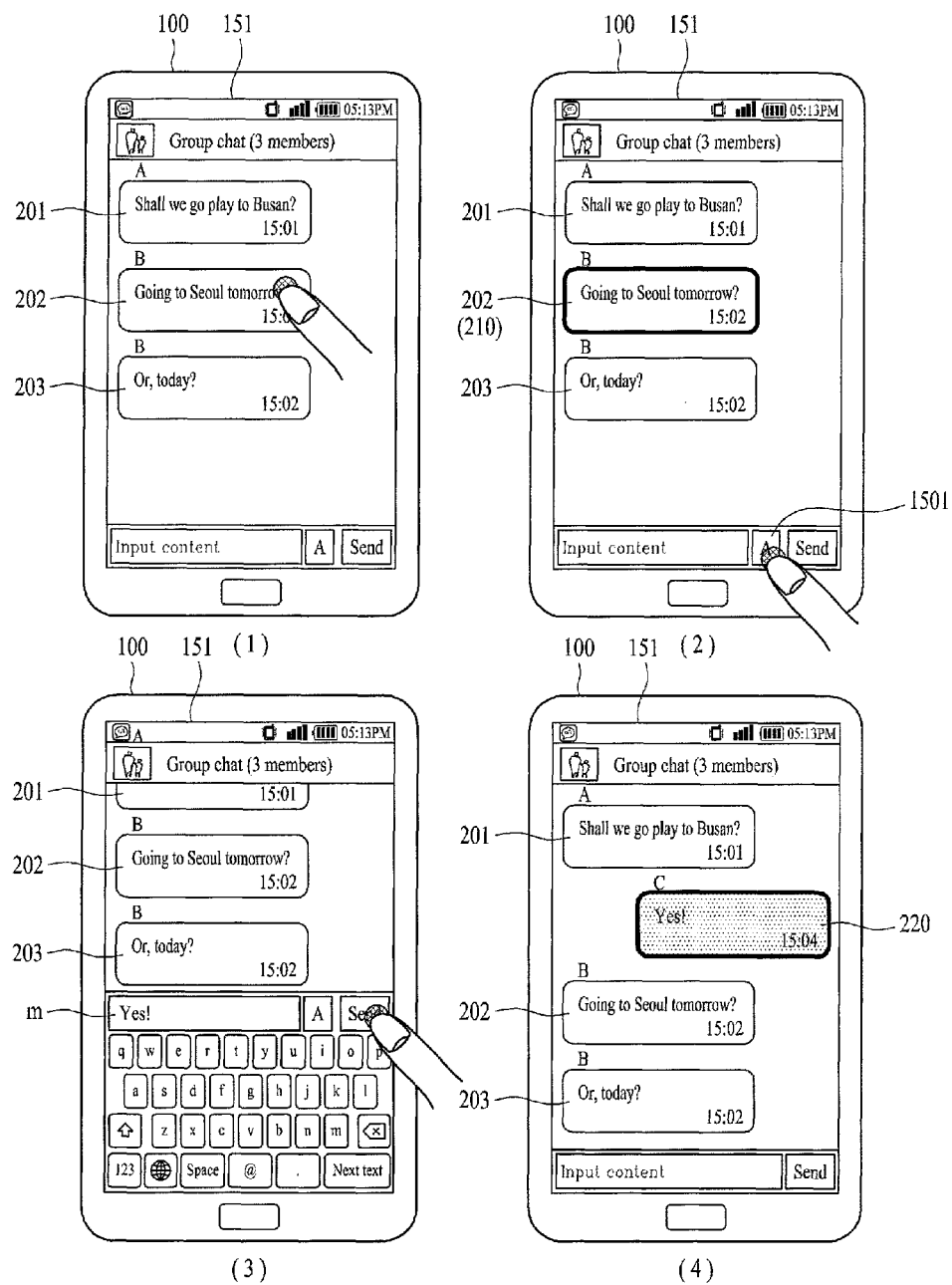

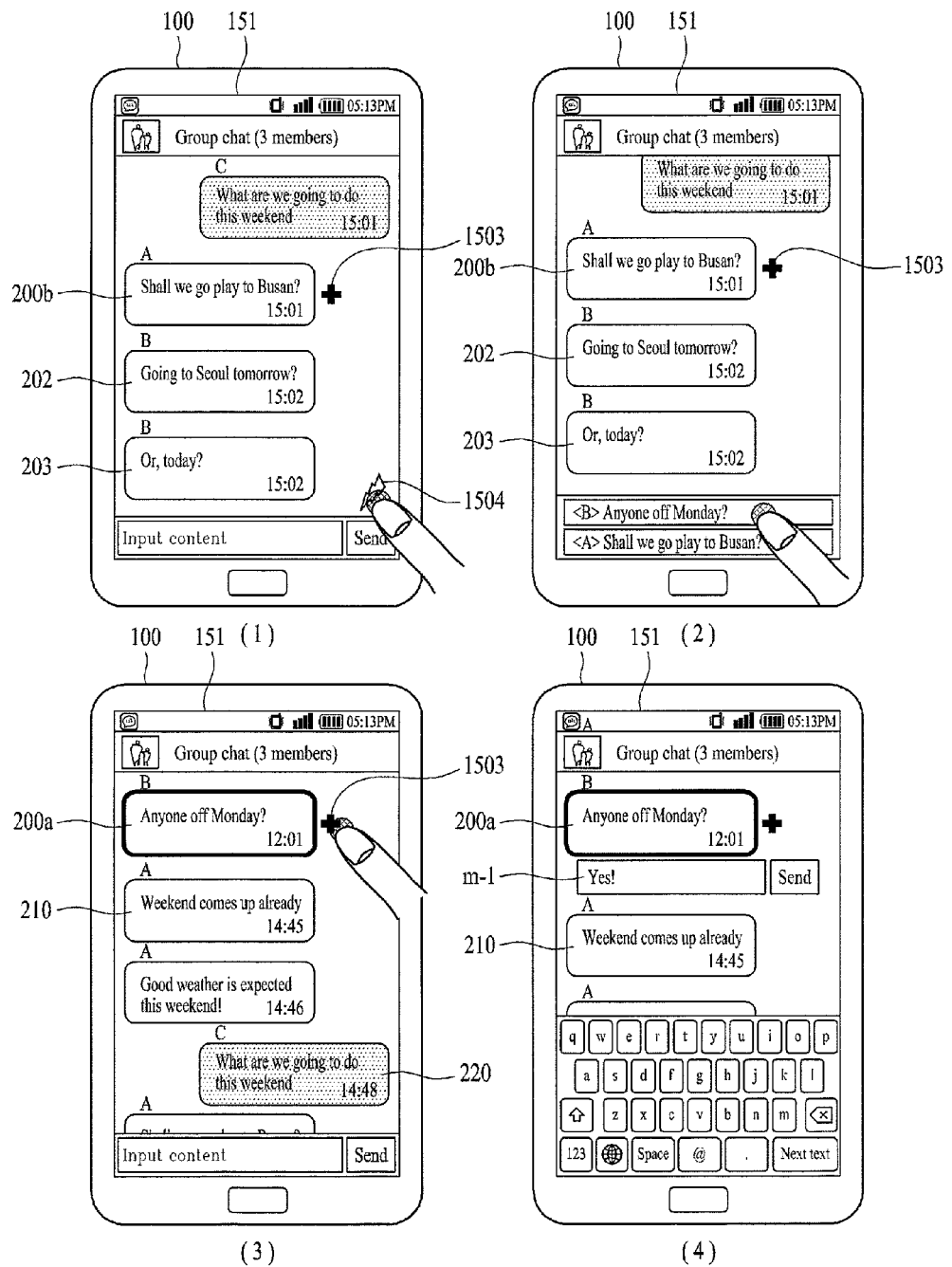

FIG. 13
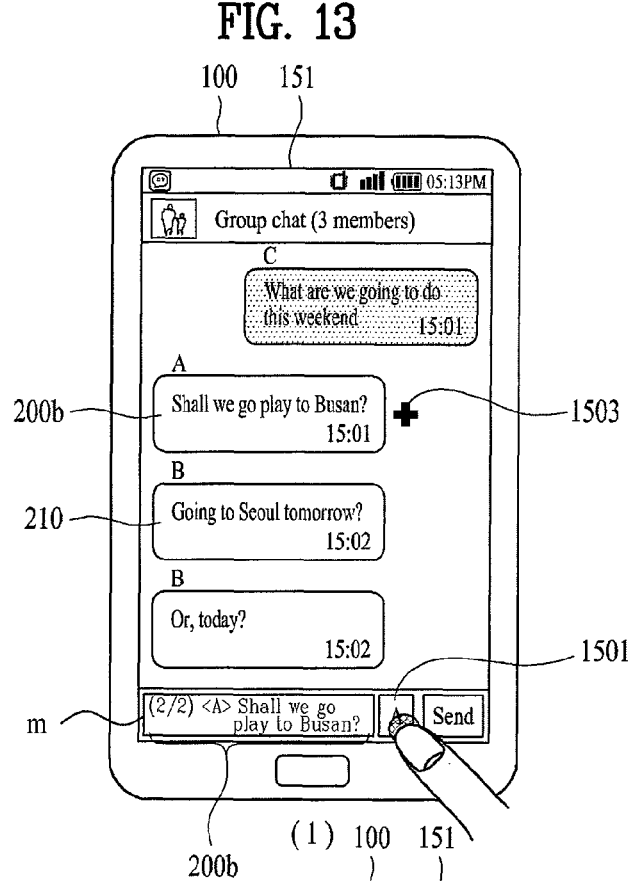
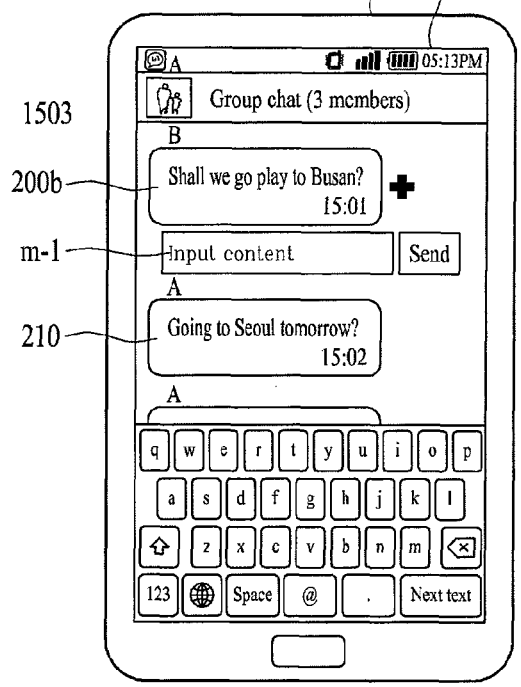

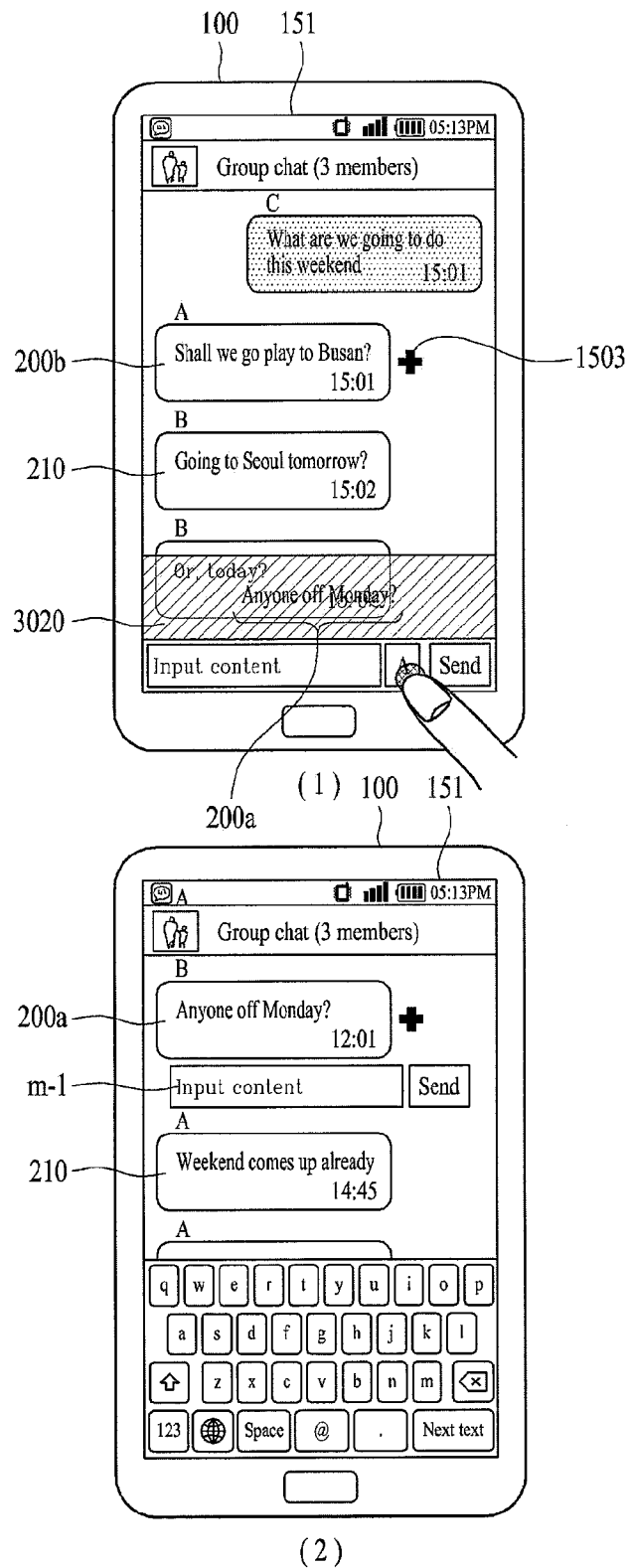

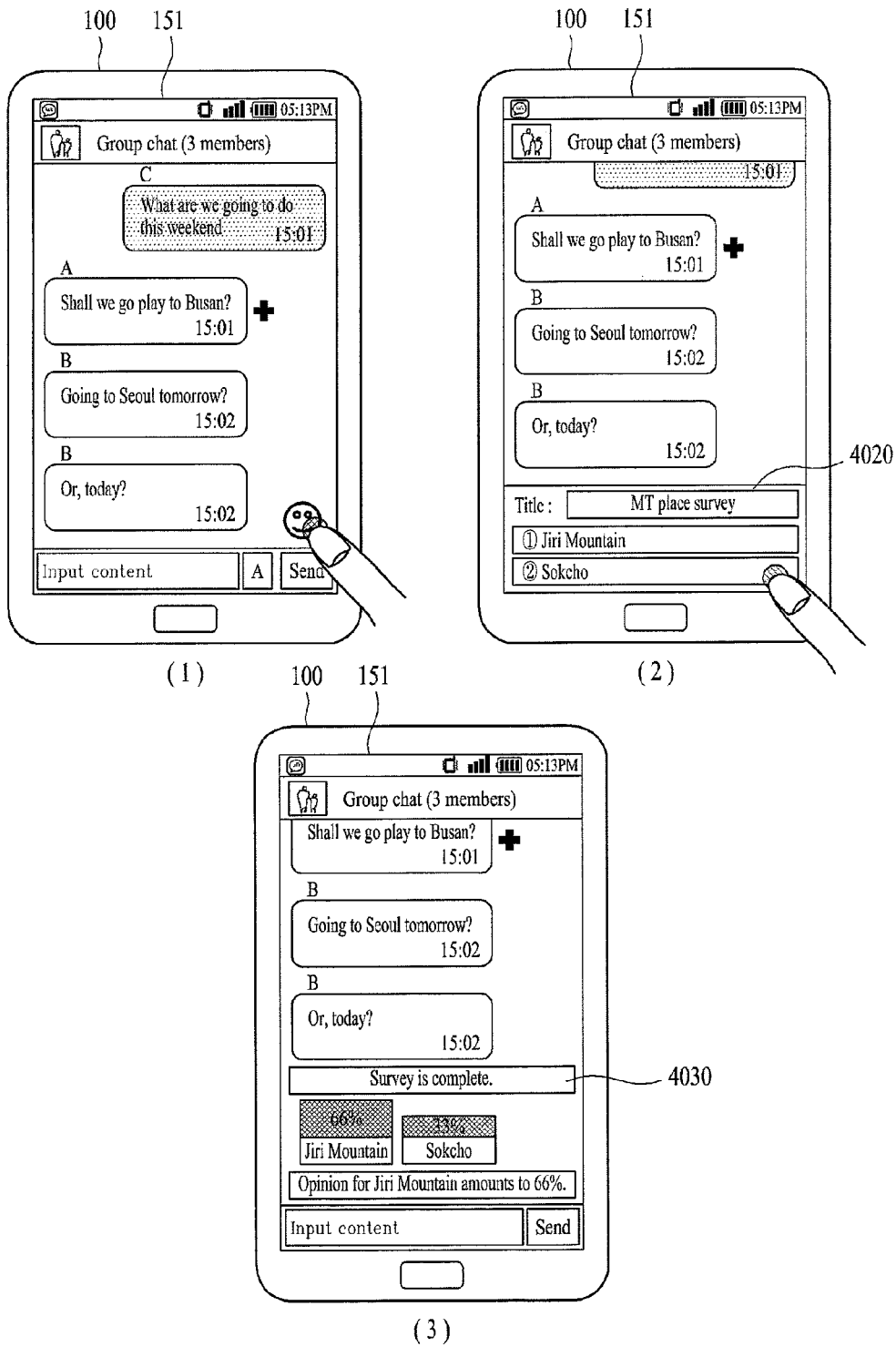

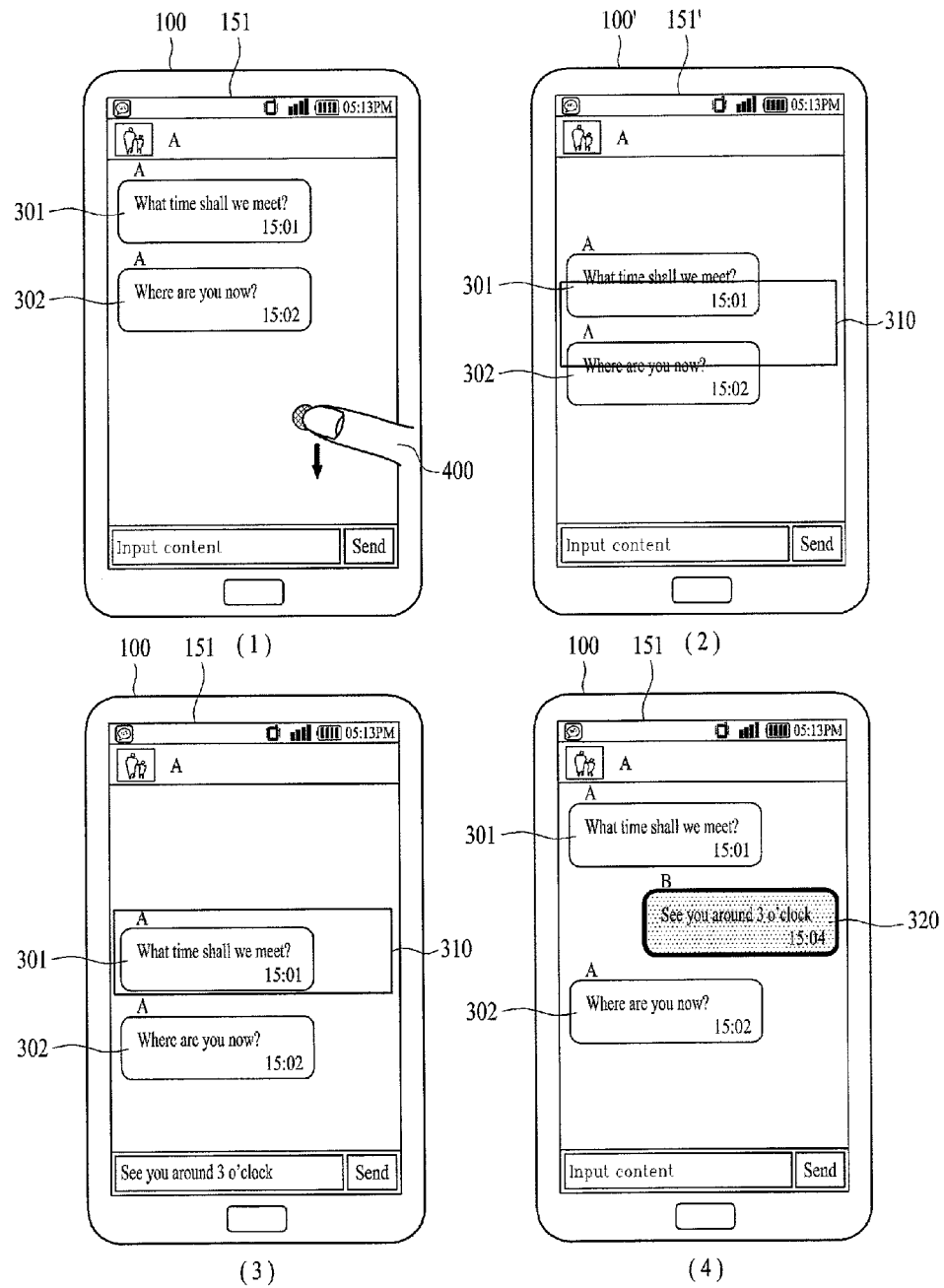

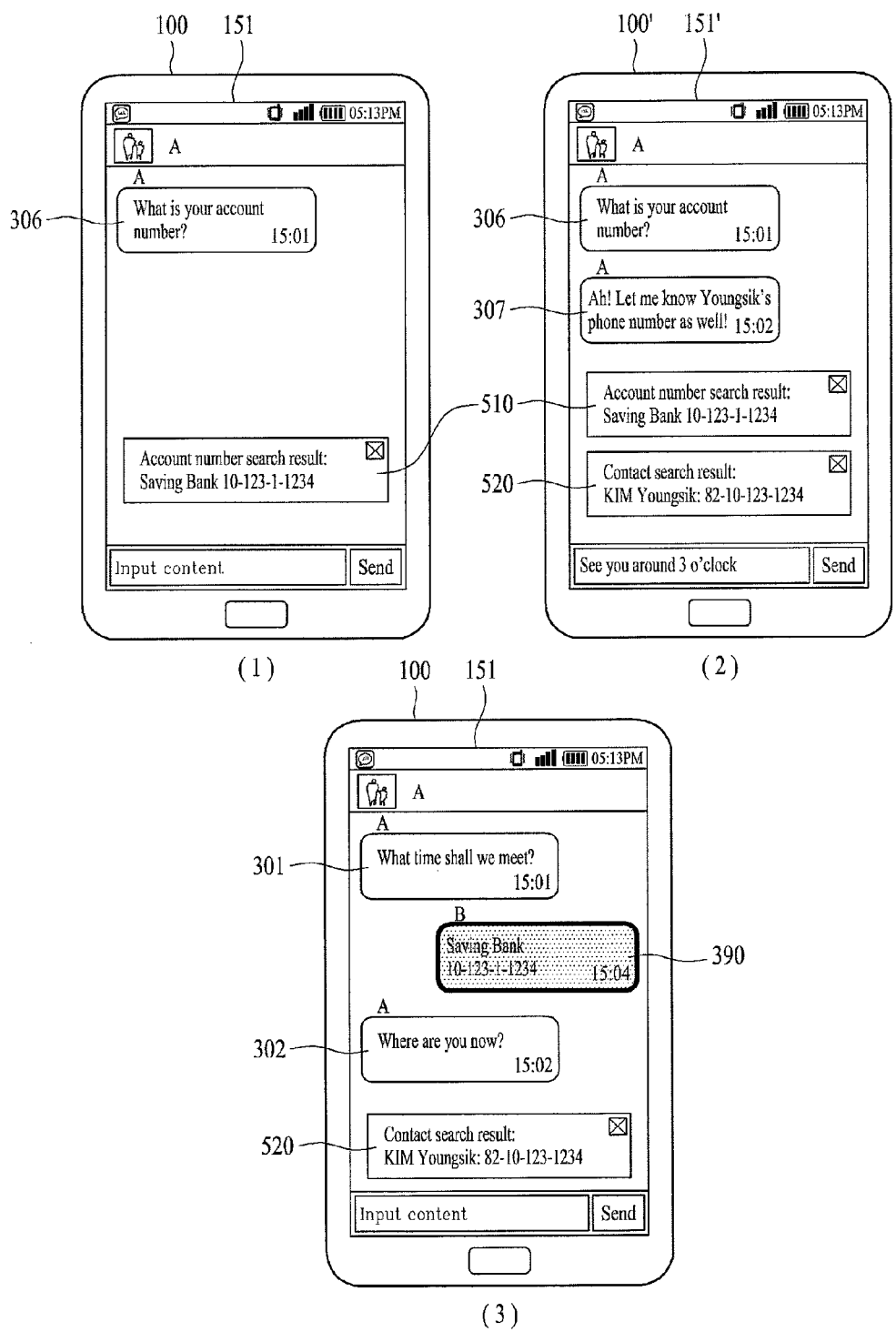

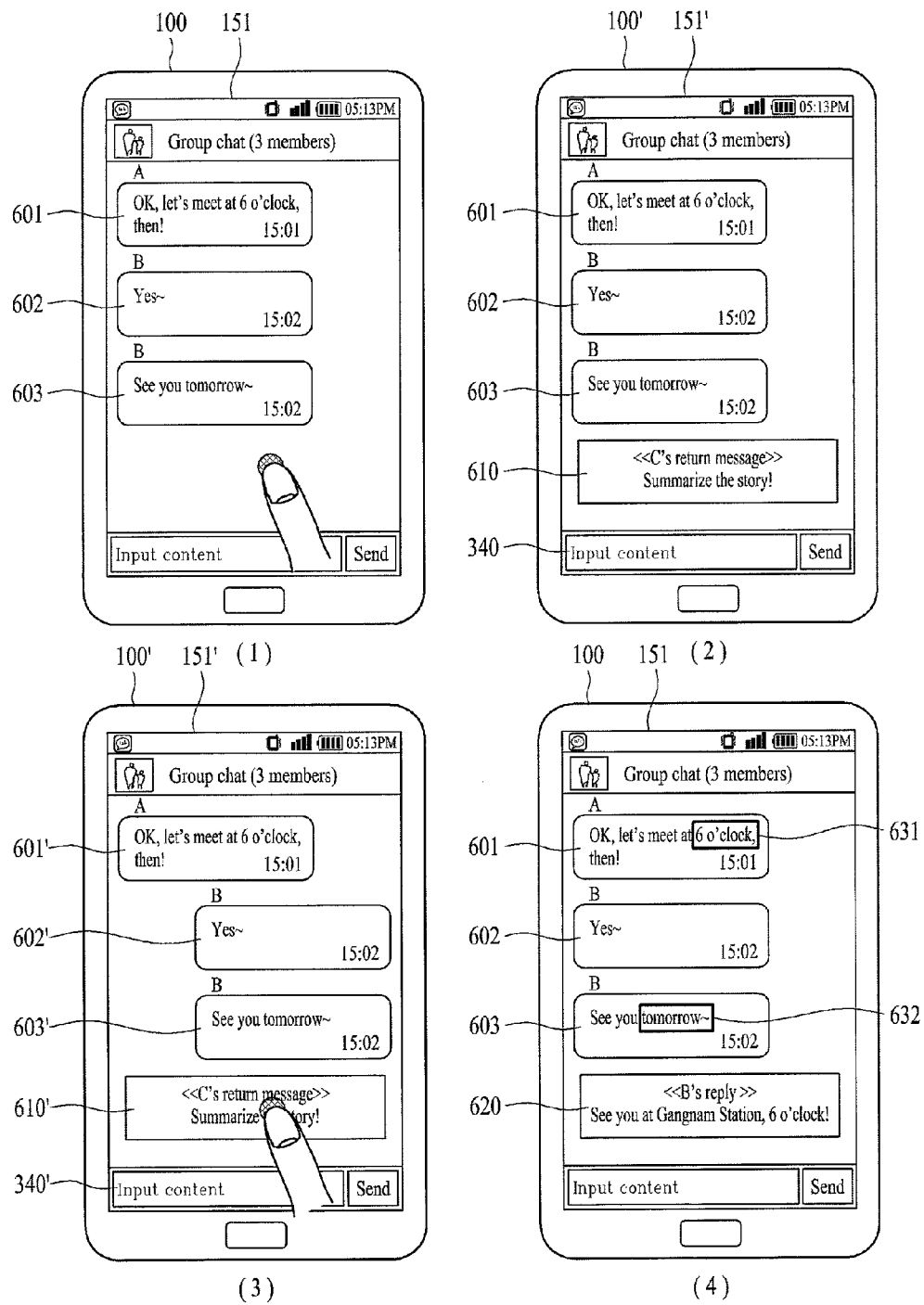

MOBILE TERMINAL, MESSAGE TRANSCEIVING SERVER AND CONTROLLING METHOD THEREOF

Pursuant to 35 U.S.C. §119(a), this application claims the benefit of earlier filing date and right of priority to Korean Patent Application Nos. 10-2012-0156733 and 10-2013-0027973, filed on Dec. 28, 2012 and Mar. 15, 2013, respectively, the contents of which are hereby incorporated by reference herein in their entirety.

BACKGROUND OF THE INVENTION

Field of the Invention

The present invention relates to a mobile terminal, and more particularly, to a mobile terminal, message transceiving server and controlling method thereof. Although the present invention is suitable for a wide scope of applications, it is particularly suitable for providing a function of editing the displayed order of a plurality of messaged transceived with a specific counterpart in accordance with various references.

Discussion of the Related Art

Generally, terminals can be classified into mobile/portable terminals and stationary terminals. The mobile terminals can be further classified into handheld terminals and vehicle mounted terminals. As functions of the terminal are becoming diversified, the terminal is implemented as a multimedia player provided with composite functions such as photographing of photos or videos, playback of music or video files, game play, broadcast reception, etc.

Using the above-mentioned mobile terminal, a user can exchange messages with a counterpart located in a remote distance. Messages exchanged with a specific counterpart are displayed on a dialogue chat window screen configured for the specific counterpart in order of transmitted/received time. In this instance, the chat window screen may be configured for a single counterpart or a plurality of counterparts. A plurality of counterparts included in a single chat window screen can exchange messages with each other. In doing so, the exchanged messages are displayed in order of transmitted/received time.

However, the related art method of displaying messages is limited in nature and are always displayed in the order of transmission/reception irrespective of contents of the messages. This inconveniences the user especially when sending messages with multiple counterparts.

SUMMARY OF THE INVENTION

Accordingly, one object of the present invention is to provide a mobile terminal, message transceiving server and controlling method thereof that substantially obviate one or more problems due to limitations and disadvantages of the related art.

Another object of the present invention is to provide a mobile terminal, message transceiving server and controlling method thereof, by which messages displayed on a chat window screen configured for at least one specific counterpart can be displayed in modified order different from that of transmitted/received time.

Another object of the present invention is to provide a mobile terminal, message transceiving server and controlling method thereof, by which messages displayed on a terminal of the specific counterpart can be displayed in the modified order as well.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention provides a mobile terminal including a wireless communication unit configured to transceive messages with at least one counterpart terminal; a touchscreen configured to display the messages transceived with the at least one counterpart terminal in a transceived order; and a controller configured to receive a selection of a first message displayed at a first position among the messages transceived with the at least one counterpart terminal, move the selected first message to different position on the touchscreen such that the transceived messages are displayed in a non-transceived order, and transmit a message rearrangement command to the at least one counterpart terminal for rearranging messages displayed on a touchscreen of the at least one counterpart terminal in the non-transceived order. The present invention also provides a corresponding method of controlling the mobile terminal.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a flowchart illustrating a method of controlling a mobile terminal according to one embodiment of the present invention;

FIG. 6 is a flowchart illustrating a method of controlling a mobile terminal according to another embodiment of the present invention;

FIG. 7A and FIG. 7B are diagrams illustrating one example of an operating method of a mobile terminal according to the embodiment shown in FIG. 6;

FIG. 12 is a diagram illustrating one example of a method of inputting a second message if there are a plurality of messages designated as reference messages;

FIG. 13 is a diagram illustrating one example of a method of displaying one of at least one or more reference messages on a touchscreen;

FIG. 15 is a diagram illustrating another example of a method of displaying one of at least one or more reference messages on a touchscreen;

FIG. 16A and FIG. 16B are diagrams illustrating one example of providing a questionnaire and statistics function through a question message and an answer message;

FIG. 25 is a diagram illustrating one example of a method of determining a location, at which a message to be transmitted will be arranged, through a scroll in a mobile terminal according to one embodiment of the present invention;

FIG. 26 is a diagram illustrating one example of a case of applying an answer recommendation function in a mobile terminal according to one embodiment of the present invention; and FIG. 27 is a diagram illustrating one example of a function executable through a message, which can be edited by all chat participants, in a mobile terminal according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to the mobile terminal 100, and it should be noted that such teachings may apply equally to other types of terminals such as digital TV, desktop computers and so on.

Figure 1:
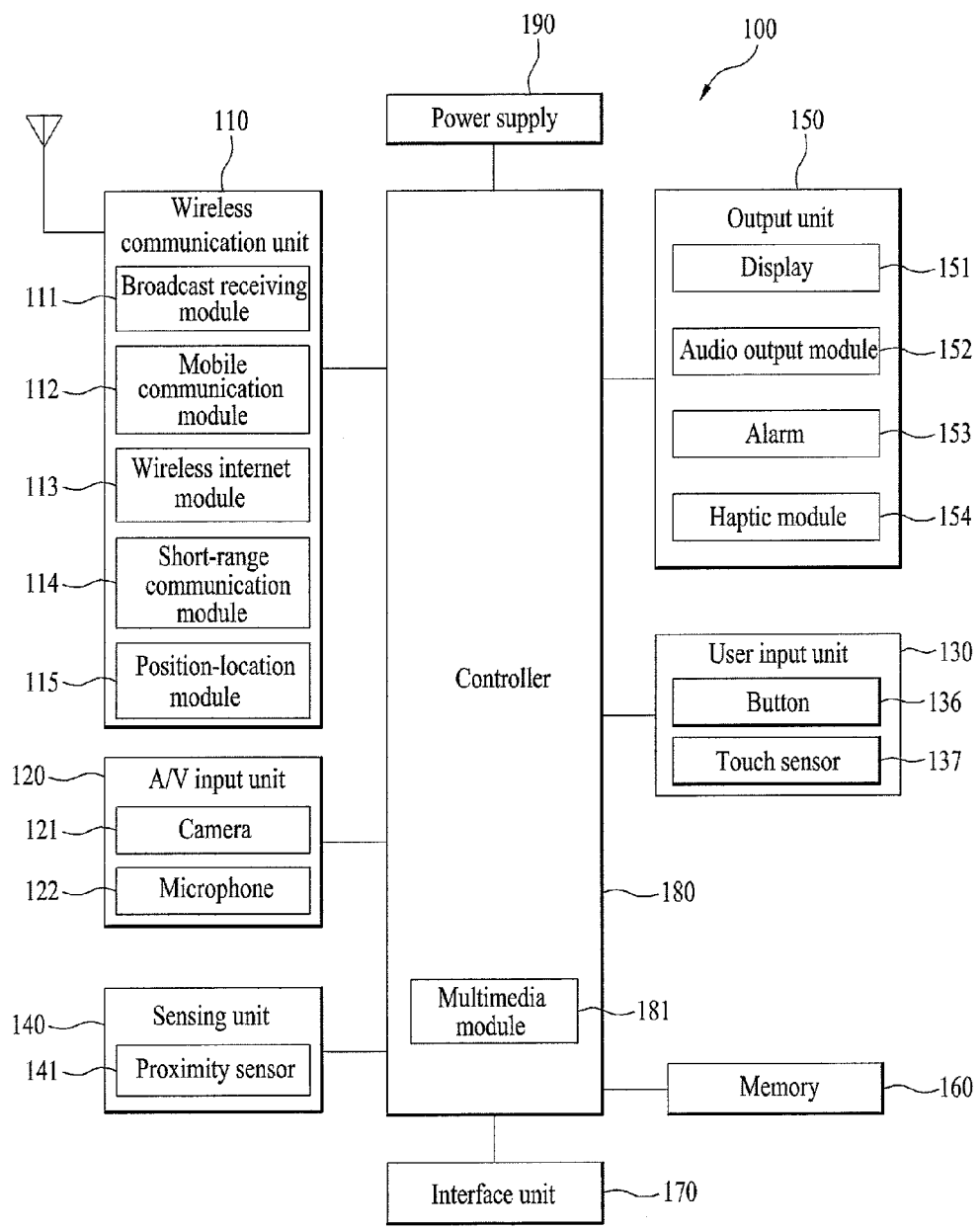
FIG. 1 is a block diagram of a mobile terminal according to one embodiment of the present invention.

FIG. 1 is a block diagram of the mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, the mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

FIG. 2A is a front perspective view of a mobile terminal according to one embodiment of the present invention. The mobile terminal 100 illustrated in FIG. 2A has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Figure 2:
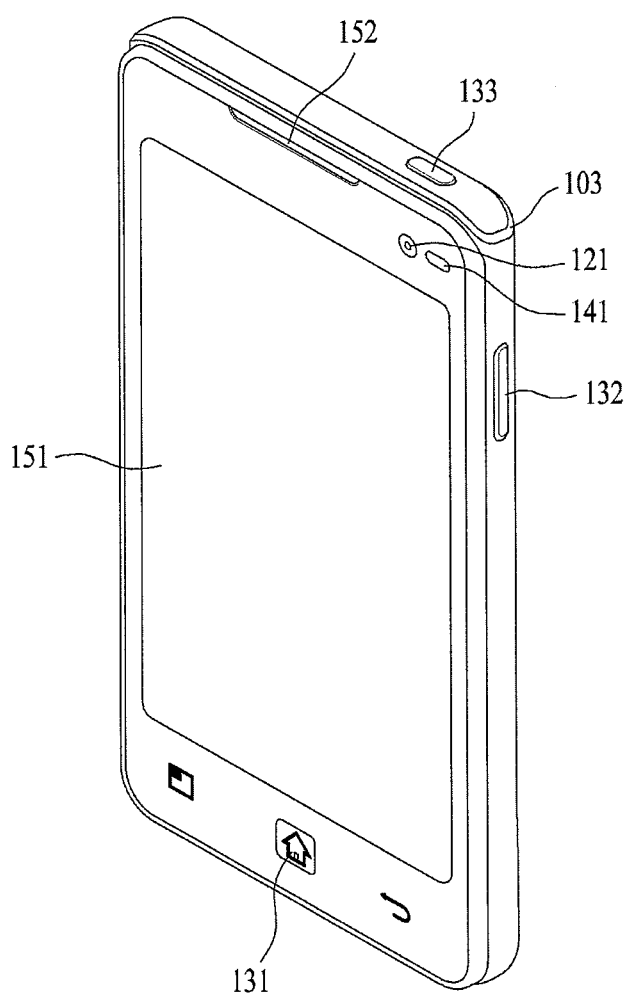
FIG. 2 is a front perspective diagram of a mobile terminal according to one embodiment of the present invention.
Figure 3:
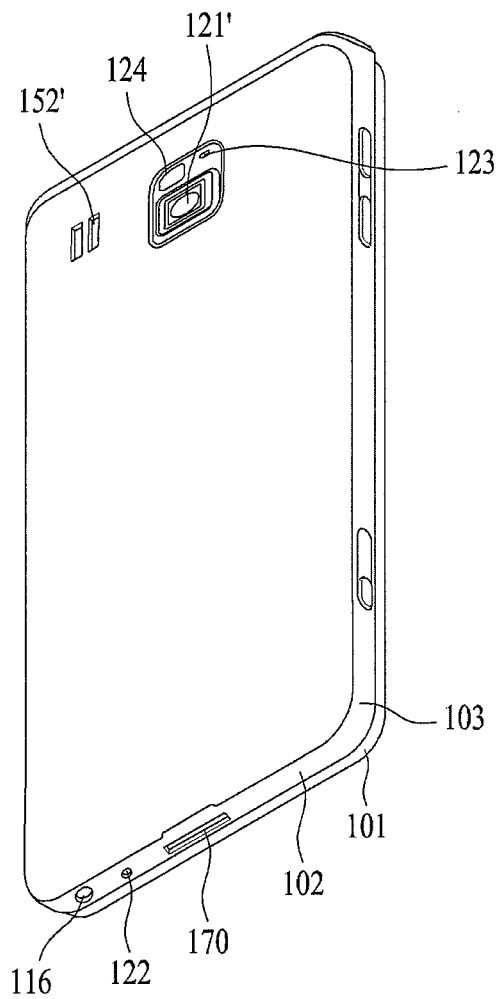
FIG. 3 is a rear perspective diagram of a mobile terminal according to one embodiment of the present invention.

Referring to FIGS. 2 and 3, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132. A third manipulating unit 133 may also be included.

FIG. 3 is a rear perspective view of the terminal of FIG. 2. Referring to FIG. 2, a camera 121' can be additionally provided at a rear of the terminal body, and more particularly, at the rear case 102. The camera 121' captures images along a direction that is substantially opposite to that of the camera 121 and may have a pixel resolution different from that of the camera 121.

According to one embodiment, for instance, the camera 121 has a relatively low number of pixels sufficient to capture and transmit a picture of a user's face for a video call, while the camera 121' has a relatively high number of pixels for capturing a photograph (e.g., a finer detail photograph) of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output module 152' can be provided at the rear of the terminal body. The additional audio output module 152' is for implementing a stereo function together with the audio output module 152 (see FIG. 2A) and may be used for implementation of a speakerphone mode when speaking over the terminal.

A broadcast signal receiving antenna 116 can be additionally provided at the lateral side of the terminal body as well as an antenna for communication. The broadcast signal receiving antenna may constitute a portion of the broadcast receiving module 111 (see FIG. 1) and be retractable into the terminal body.

A power supply unit for supplying a power to the terminal 100 is provided at the terminal body. Furthermore, the power supply unit can be configured to be built within the terminal body. Alternatively, the power supply unit can be configured to be detachably connected to the terminal body.

A touchpad 135 for detecting a touch can be additionally provided at the rear case 102. The touchpad 135 can be configured as a light transmittive type similar to the display 151. In this instance, if the display 151 is configured to output visual information from both of its faces, the visual information is viewable via the touchpad 135 as well. The information output from both of the faces can be entirely controlled by the touchpad 135.

Alternatively, a display is further provided for the touchpad 135 so that a touchscreen can be provided at the rear case 102 as well. The touchpad 135 is activated by interconnecting with the display 151 of the front case 101. The touchpad 135 can be provided at the rear of the display 151 to extend parallel to the display 151. The touchpad 135 can have a size equal to or smaller than the size of the display 151.

The following description is made on the assumption that the display module 151 includes a touchscreen. Moreover, a message mentioned in the description of the present invention includes a text message (e.g., SMS (short message service) message, LMS (long message service) message, etc.) or a multimedia message (e.g., MMS (multimedia message service) message, etc.). Furthermore, embodiments of the present invention described in the following description are applicable to a received data of any type (e.g., email, etc.) that requires a user confirmation as well as to a message.

According to one embodiment of the present invention, a mobile terminal transceives messages with a counterpart through a wireless communication unit and a first message transmitted to or received from a specific counterpart is displayed on a touchscreen. Preferably, the first message can be displayed through a chat window configured for the specific counterpart. In addition, the message exchanged with the specific counterpart can be included in the chat window only. Moreover, the first message can include one of a plurality of messages displayed by being previously transceived with the specific counterpart.

In this instance, a user can access the chat window by selecting one message item from a counterpart based message list. The counterpart based message list can include at least one message item corresponding to each of at least one counterpart. If a plurality of messages are received from the specific counterpart, a plurality of the messages configure a single chat window and a single message item corresponding to the chat window is created. Of one message item is selected from the counterpart based message list, the chat window screen can be accessed.

In this instance, there may exist a single specific counterpart or a plurality of specific counterparts. When there are a plurality of the specific counterparts, the specific counterparts can be configured as a single group. A single chat window can be configured for the single group. In addition, all messages sent by members of the group can be included in the chat window. Moreover, the message sent by each of the members can be viewed by the rest of the members.

A first message may be one of at least one or more messages transceived with a specific counterpart. For instance, when a specific message is transmitted, the specific message can be designated as the first message. In another instance, when a specific message is transmitted, another message specifically related to the specific message can be designated as the first message. In another instance, a message selected by a user from messages displayed by being previously transmitted can be designated as the first message.

According to an embodiment of the present invention, when a message rearrangement command is input, the controller controls a second message to be displayed by being rearranged ahead of the previously transceived first message. In particular, the controller controls the second message transceived behind the first message to be rearranged by preceding the first message.

The second message may include a message displayed on the touchscreen by being transceived after the first message has been transceived. Alternatively, the second message may include a message transceived by being newly input together with the message rearrangement command. In the former case, the second message may include a message selected by a user from messages previously transceived with a specific counterpart. In the latter case, when a specific message is transmitted, the specific message can be designated as the second message.

When the message rearrangement command is input, the controller transmits a command for the second message to be displayed in a terminal of the at least one specific counterpart by being rearranged ahead of the first message to the terminal of the at least one specific counterpart.

In particular, the controller rearranges the second message in the user's terminal and also transmits the control command to the terminal of the specific counterpart in order for the second message to be identically rearranged in the terminal of the specific counterpart. Hence, in the terminal of the specific counterpart, the second message is rearranged by preceding the first message.

As mentioned in the foregoing description, the present embodiment may include detailed embodiments related to when a second message includes a previously transceived and displayed message and when a second message includes a newly input message. The two cases shall be named a first embodiment and a second embodiment, respectively. In addition, operations of the terminal according to the detailed embodiments shall be described in turn as follows.

Figure 5A:
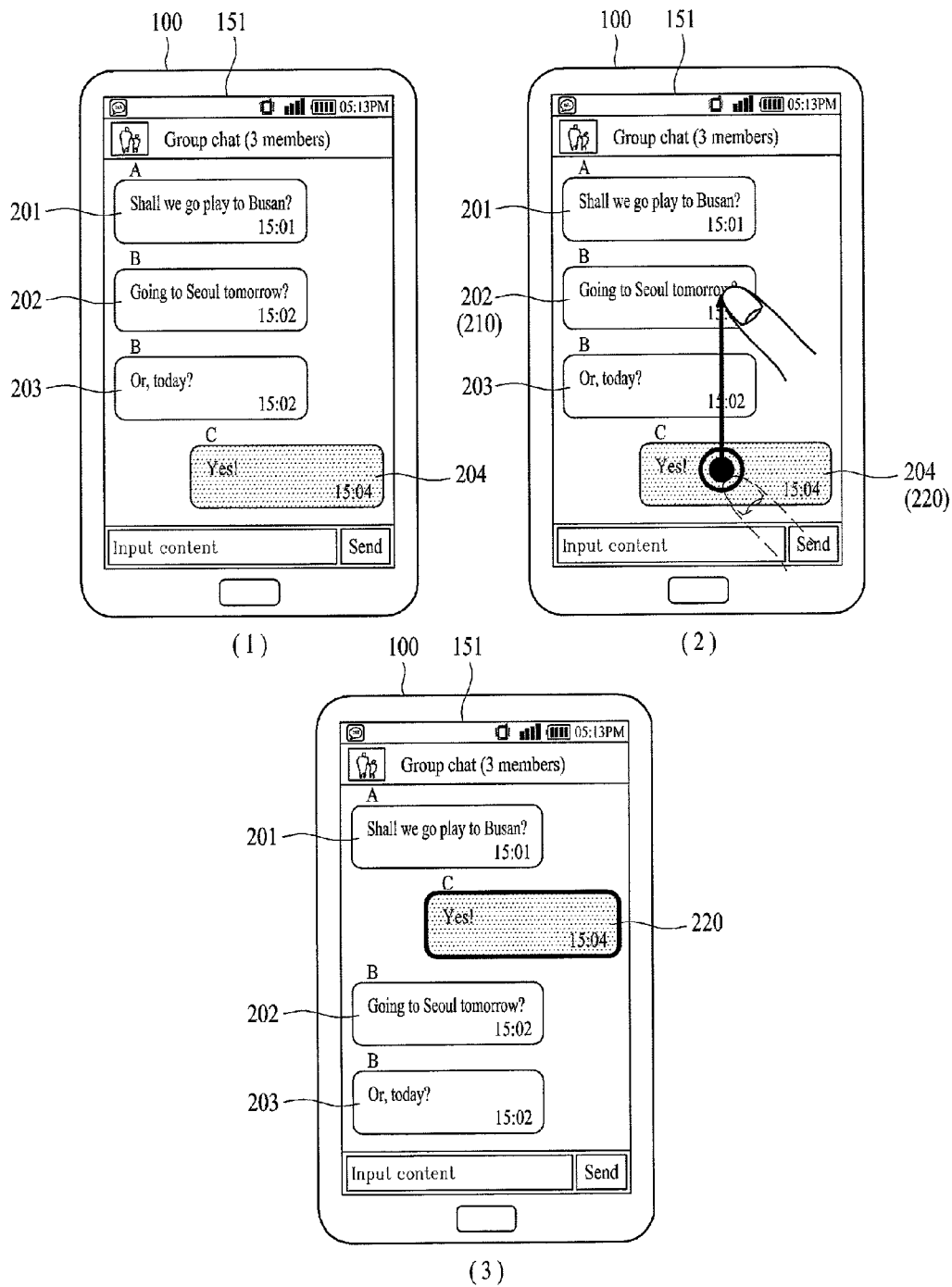
FIG. 5A and FIG. 5B are diagrams illustrating one example of an operating method of a mobile terminal according to the embodiment shown in FIG. 4.
Figure 5B:
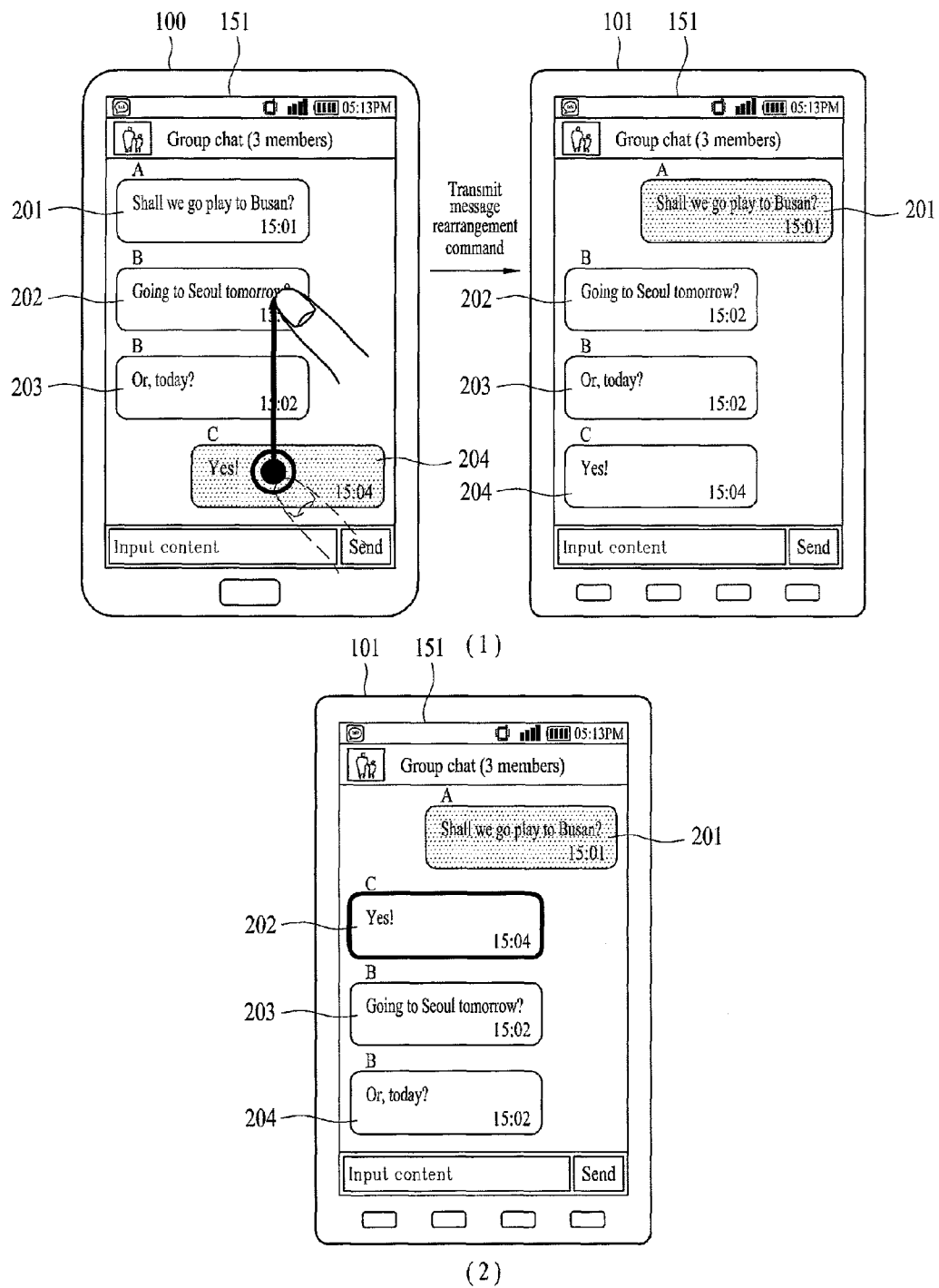

Next, FIG. 4 is a flowchart for controlling the mobile terminal according to the first embodiment of the present invention. FIG. 5A and FIG. 5B are diagrams illustrating one example of an operating method of a mobile terminal of a user and an operating method of a mobile terminal of a specific counterpart according to the first embodiment.

In the following drawings, assume that a first message and a second message are included in a chat window for transmitting and receiving messages among A, B and C. At least one or more messages transmitted by each of the A, the B and the C are displayed on the chat window. In addition, the first message and the second message may be included in the at least one or more messages. In the accompanying drawing, the mobile terminal 100 of a user includes a terminal 100 of the C and a terminal 101 of a specific counterpart includes a terminal of the A or a terminal of the B.

Referring to FIG. 4, a wireless communication unit transceives a first message and a second message with a specific counterpart in order and a controller can display the first message and the second message in order of transmitted time (S401).

According to the present embodiment, the first message is transmitted or received ahead of the second message. Both of the first message and the second message are transmitted or received before a message rearrangement command is input by a user or received externally.

Since the first message is transceived ahead of the second message, the first message is displayed ahead of the second message. If a different message is transceived by being inserted between the first message and the second message, the different message may be displayed behind the first message and ahead of the second message.

According to one embodiment, each of the first message and the second message may be the message selected by a user from a plurality of messages transceived with a specific counterpart. The user can select a specific message as the first message and can select one of messages transceived behind the specific message as the second message. On the contrary, the user can select a specific message as the second message and can select one of messages transceived behind the specific message as the first message.

For instance, the user can select the first message and the second message by applying a long touch input and a touch drag input continuously. If the long touch input is applied to one of the messages displayed on a touchscreen, the controller 180 can recognize the long touched message as the second message. After completion of the long touch, if the touch drag input is subsequently applied, the controller 180 can recognize the message overlapping an end point of the touch drag input as the first message.

On the contrary, if the long touch input is applied to one of the messages displayed on a touchscreen, the controller 180 can recognize the long touched message as the first message. After completion of the long touch, if the touch drag input is subsequently applied, the controller 180 can recognize the message overlapping an end point of the touch drag input as the second message.

In particular, referring to FIG. 5A (1), a plurality of messages 201 to 204 respectively transmitted by A, B and a user C of the mobile terminal 100 can be displayed on the touchscreen 151 of the mobile terminal 100 of the user. In doing so, the messages 201 to 204 are displayed in order of transmission.

Referring to FIG. 5A (2), while the transceived messages 201 to 204 are displayed on a chat window in order of transmission, the user can long touch one message 204. Subsequently, the user can apply a touch drag input. In doing so, the user can end the touch drag input on another message 202. In response to the continuous long touch and touch drag command, the controller 180 recognizes the long touch input applied message 204 as a second message 220 and also recognizes the message 202 overlapping an end point of the touch drag input as a first message 210.

While both of the first message and the second message are displayed, a message rearrangement command for the second message can be input (S402). In doing so, the message rearrangement command can be input through the touchscreen by the user. In this instance, the message rearrangement command may include a touch input of a specific pattern. Alternatively, the message rearrangement command may be received from an external environment of the mobile terminal. The message rearrangement command may be delivered from one of the terminals of the at least one or more specific counterparts or from a message server.

When the message rearrangement command is input, the controller 180 can display the second message by rearranging the second message to be situated ahead of the first message (S403). In particular, the second message displayed behind the first message can be displayed by being displayed ahead of the first message. As a result, the order of the messages displayed on the touchscreen of the mobile terminal can be modified.

For instance, the controller 180 can recognize an action, which is performed by long touching one of the messages displayed on the touchscreen and then continuously applying a touch drag input, as the message rearrangement command. As mentioned in the foregoing description, the continuous long touch and touch drag input may be handled as the user command for specifying the first message and the second message. In this instance, using a single touch input, the user can select a message (e.g., second message) and a location (e.g., a location of the first message) for rearranging the selected message and then give the message rearrangement command.

In particular, the controller 180 can recognize the long touch and touch drag input shown in FIG. 5A (2) as the rearrangement command. In response to this command, referring to FIG. 5A (3), the controller 180 can rearrange the second message 220 so the selected second message 220 is displayed ahead of the first message 210. Thus, the second message 220 is displayed ahead of the first message 210 despite that the second message 220 is transmitted behind the first message 210.

Referring to FIG. 5A (3), if the order of the displayed message is modified by the message rearrangement command, the controller 180 can display the rearranged message 220 by being discriminated from other messages. For instance, referring to FIG. 5A (3), the controller 180 can control the touchscreen to display a highlighted outline of the second message 220.

Moreover, when the message rearrangement command is input, the controller 180 can control the wireless communication unit to transmit a command for rearranging the second message to the terminal of the at least one specific counterpart (S404). In doing so, the wireless communication unit can directly transmit the message rearrangement command to the terminal of the counterpart or may transmit the message rearrangement command to the message server. When the message rearrangement command is transmitted to the message server, the message server can transmit the message rearrangement command to the terminal of the counterpart.

In this instance, the message rearrangement command can control the terminal of the counterpart so that the second message can be rearranged ahead of the first message in the terminal of the counterpart. In particular, as the message rearrangement command is received, a controller of the terminal of the at least one specific counterpart rearranges the second message to be located ahead of the first message and can then control the messages to be displayed in order of the rearrangement. As a result, the messages displayed on the terminal of the counterpart can be displayed in modified order as well.

In particular, referring to FIG. 5B (1), when a continuous long touch and touch drag input is input as a message rearrangement command, the mobile terminal 100 can transmit the message rearrangement command to a terminal 101 of a specific counterpart. In this instance, the terminal 101 of the specific counterpart may include both a terminal of A and a terminal of B.

Referring to FIG. 5B (2), if the message rearrangement command is received, a controller of the specific counterpart terminal 101 can rearrange a second message 202 so that the second message 220 can be displayed ahead of a first message 210. Simultaneously, the specific counterpart terminal 101 can display the rearranged second message 220 by being discriminated from other messages. For instance, referring to FIG. 5B (2), the specific counterpart terminal 101 can control the touchscreen to display a highlighted outline of the second message 220.

Figure 7B:
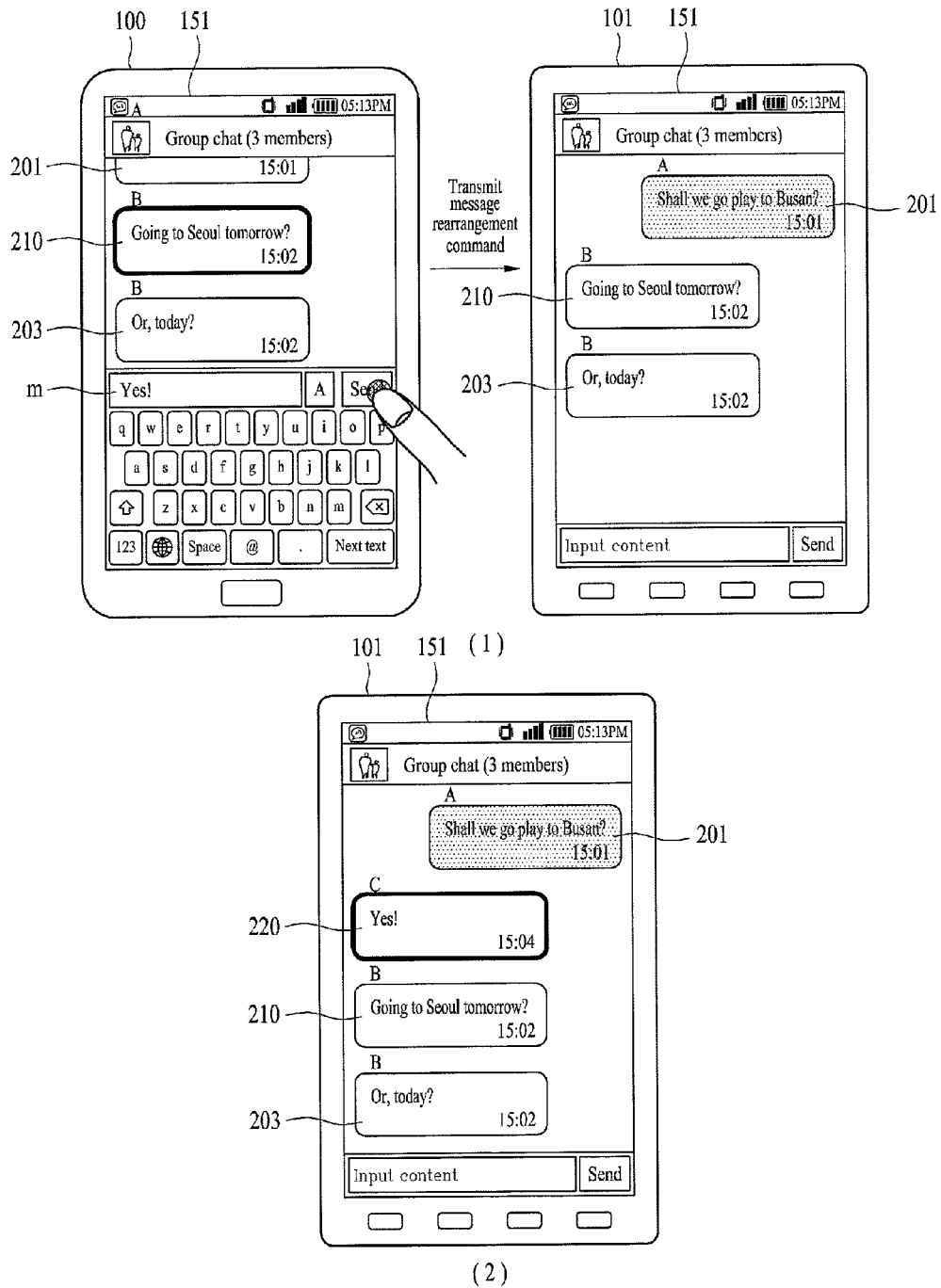

Next, FIG. 6 is a flowchart for controlling a mobile terminal according to the second embodiment of the present invention. Moreover, FIG. 7A and FIG. 7B are diagrams illustrating one example of a method of operating a mobile terminal of a user and a mobile terminal of a specific counterpart according to the second embodiment.

Referring to FIG. 6, a wireless communication unit transceives a first message with a specific counterpart and a controller can display the first message (S601). According to one embodiment, the first message may include a message selected by a user from a plurality of displayed messages transceived with the specific counterpart.

In particular, referring to FIG. 7A (1), a plurality of messages 201 to 203 respectively transmitted by A, B and a user C of the mobile terminal 100 can be displayed on the touchscreen 151 of the mobile terminal 100 of the user. In doing so, the messages 201 to 203 are displayed in order of transmission.

The user can touch one 202 of the displayed messages. The controller 180 can recognize the touched message 202 as a first message. According to one embodiment, referring to FIG. 7A (2), the controller 180 can display the message 210 selected as the first message by being discriminated from other messages. For instance, the controller 180 can control the touchscreen to display a highlighted outline of the first message 210.

Thus, while the first message is displayed, a new message is input to a message input field and a command for transmitting the new message can be input (S602). In doing so, the message transmitted by being newly input to the message input field can be designated as a second message. In this instance, the controller recognizes the new message as the second message. In response to the transmission command, the controller 180 can control a wireless communication unit to transmit the new message.

When the transmission command for transmitting the new message is input, the controller 180 can recognize the transmission command for transmitting the new message as a message rearrangement command for rearranging the new message (S603). As the controller recognizes the new message as the second message, the transmission command for transmitting the new message is recognized as a message rearrangement command for rearranging the second message.

When the new message transmitting command (i.e., the transmission command for transmitting the new message) is input, the controller 180 can display the new message by being rearranged ahead of the first message (S604). In particular, the controller 180 can rearrange the newly transmitted message so the newly transmitted message is displayed ahead of the first message already transceived and displayed. As the new message is recognized as the second message, the controller controls the second message transmitted behind the first message to be consequently displayed by being rearranged ahead of the first message.

According to one embodiment, the controller 180 displays a first icon on a touchscreen of a mobile terminal and can recognize a message, which is input and transmitted right after applying a touch input onto the first icon, as a second message. In particular, a user touches the first icon before inputting a new message, thereby being able to designate a newly transmitted message as the second message.

If the touch input to the first icon is performed, the controller 180 can recognize a message, which is input first and then transmitted, as the second message. In addition, the controller 180 can recognize a command for transmitting the message, which is recognized as the second message, as a message rearrangement command. When a new message is input and transmitted without touching the first icon, the controller does not recognize the transmission command for transmitting the message as the message rearrangement command but the newly transmitted message is displayed in order of transmission time only.

In particular, referring to FIG. 7A (2), a first icon 1501 can be displayed on the touchscreen 151. While the first message 210 is selected through the operation described with reference to FIG. 7A (1), the user can touch the first icon 1501. Referring to FIG. 7A (3), after the first icon 1501 has been touched, the user can input a new message to a message input field m. If the input of the new message is complete, the user can command a transmission of the newly input message by touching an icon 'Send'.

Since the newly transmitted message is the message transmitted by being input first after the touch to the first icon 1501, the controller 180 can recognize the new message as a second message. In addition, the controller 180 can recognize the transmission command for transmitting the new message as a message rearrangement command for rearranging the second message.

In response to the message rearrangement command, referring to FIG. 7A (4), the controller 180 can display the new message 220, which is the second message, by being rearranged ahead of the first message 210. As a result, the second message 220 is displayed ahead of the first message 210 transmitted ahead of the second message 220 despite being newly transmitted.

Referring to FIG. 7A (4), if the newly transmitted second message is displayed by being rearranged, the controller 180 can control the newly transmitted second message 220 to be displayed by being discriminated from other message. For instance, referring to FIG. 7A (4), the controller 180 can display the touchscreen to display a highlighted outline of the second message.

Moreover, when the transmission command for transmitting the new message is input, the controller 180 can display the wireless communication unit to transmit a rearrangement command for rearranging the newly transmitted message to the terminal of the at least one specific counterpart (S605).

In this instance, the message rearrangement command can control the terminal of the counterpart to enable the message (e.g., second message) received by the terminal of the counterpart to be displayed by being rearranged ahead of the first message. In particular, the terminal of the counterpart receives the newly input message from the mobile terminal of the user and is also able to receive a message rearrangement command. As the message rearrangement command is received, a controller of the counterpart terminal rearranges the newly received message ahead of the first message and can control messages to be displayed in order of the rearrangement.

In particular, referring to FIG. 7B (1), as a user touches an icon 'send', when a command for transmitting a message newly input to a message input field m is input, the mobile terminal 100 of a user can transmit a message rearrangement command to a terminal 101 of a specific counterpart.

Referring to FIG. 7B (2), if the message rearrangement command is received, a controller of the terminal 101 of the specific counterpart can control a newly received message 220 to be displayed so the message 220 newly received by the terminal 101 of the specific counterpart is displayed ahead of the first message 210 on the terminal 101 of the specific counterpart 101.

In another instance, according to the second embodiment, the controller creates an auxiliary input field in response to a user's command and then displays the auxiliary input field ahead of a first message, thereby being able to receive an input of a second message and an input of a message rearrangement command.

Figure 8:
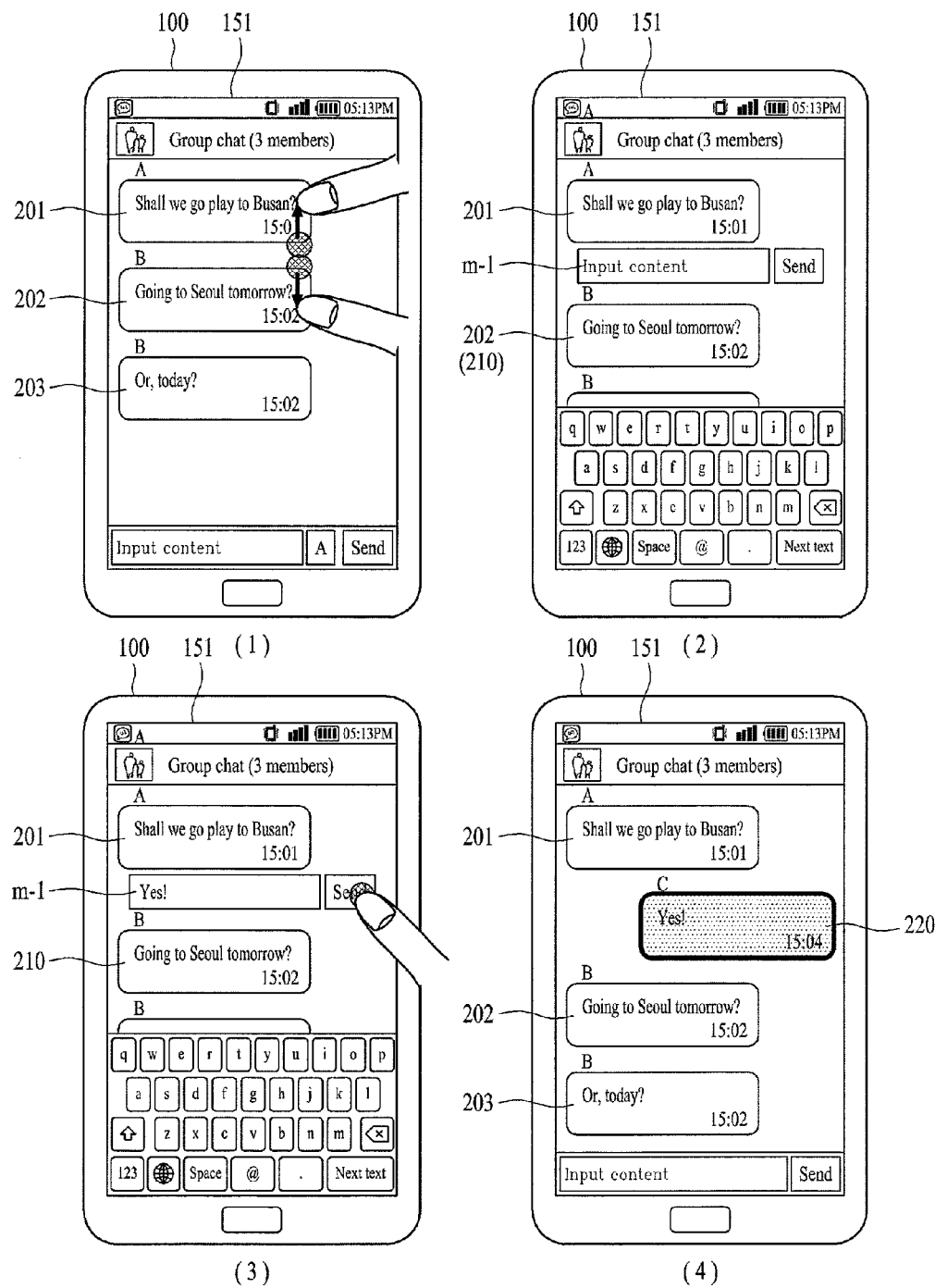
FIG. 8 is a diagram illustrating one example of a method of receiving an input of a second message and an input of a message rearrangement command through an auxiliary input field.

FIG. 8 is a diagram illustrating one example of a method of receiving an input of a second message and an input of a message rearrangement command using an auxiliary input field. According to the present embodiment, as a touch input of a specific pattern is applied, the controller 180 controls an auxiliary input field to be further displayed ahead of a first message and can then recognize a message, which is transmitted by being input to the auxiliary input field, as a second message. In particular, a user sends a new message through the auxiliary input field, thereby being able to designate a newly transmitted message as a second message.

The auxiliary input field is an input field for inputting a text and image data and can be displayed together with an icon 'send' for transmitting the input data to a specific counterpart. The auxiliary input field is displayed ahead of a previously transceived and displayed message. The auxiliary input field differs from a message input field in that a message transmitted by being input to the auxiliary input field is displayed after rearranged by being recognized as a second message. The auxiliary input field may be displayed together with or separately from the message input field.

The auxiliary input field may be displayed ahead of a first message previously selected by a user. Alternatively, as the auxiliary input field displayed at a specific location, a first message may be selected from a plurality of messages displayed on a touchscreen.

For instance, when the auxiliary input field is set to be displayed at a location on which the touch input of the specific pattern is performed, as the touch input is applied, the controller 180 displays the auxiliary input field and can automatically recognize a message, which is displayed behind the auxiliary input field, as a first message. In this instance, a user can indirectly select the first message by applying the touch input of the specific pattern.

The input of the specific pattern can be configured in various ways. For instance, the touch input of the specific pattern may include a pair of touch drag inputs that are performed by starting between two messages simultaneously and then proceeding in opposite directions. In doing so, if a touch drag input is applied by pinching out a space between the two messages with a pair of pointers, an auxiliary input field can be further displayed at a location to which the touch drag input is applied.

In another instance, the touch input of the specific pattern may include an input of touching a specific icon. In doing so, if a specific icon displayed on a touchscreen is touched, an auxiliary input field may be displayed at a specific location. As the auxiliary input field is displayed ahead of the first message, a user can be intuitively informed that the second message transmitted by being input to the auxiliary input field will be displayed ahead of the first message.

In particular, referring to FIG. 8 (1), a plurality of messages 201 to 203 may be displayed on a touchscreen of the mobile terminal 100. In doing so, a user can apply a pair of touch drag inputs, as shown in FIG. 8 (1), using two fingers that proceed in opposite directions by simultaneously starting between the two messages 201 and 202.

In response to the above-mentioned touch drag inputs, referring to FIG. 8 (2), the controller 180 can display an auxiliary input field m−1 between the two messages 201 and 202. The controller 180 can recognize the message 202, which is displayed behind the auxiliary input field m−1, as a first message 210 while displaying the auxiliary input field m−1.

Once the auxiliary input field m−1 is displayed, as mentioned in the above description, referring to FIG. 8 (3), the user input s new message to the auxiliary input field m−1 and can then command a transmission of the message input to the auxiliary input field m−1 by touching an icon 'send'. The controller recognizes the message, which is transmitted by being input to the auxiliary input field m−1, as a second message and can then recognize the transmission command as a rearrangement command for rearranging the second message.

Subsequently, referring to FIG. 8 (4), the controller transmits the second message 220 input to the auxiliary input field m−1 and can display the second message 220 by being rearranged behind the first message 210. Moreover, when the command for transmitting the message input to the auxiliary input field m-1 is input, the controller 180 can display a wireless communication unit to transmit the rearrange command for rearranging the newly transmitted message to a terminal of a specific counterpart.

According to the first and second embodiments mentioned in the foregoing description, the order of the displayed messages previously transmitted can be modified. In doing so, as soon as the messages are displayed on the user's terminal in the modified order, the messages can be displayed in the modified order in the terminal of the specific counterpart exchanging the messages with the user's terminal. As a result, utilization and convenience in using messages can be enhanced.

Figure 9:
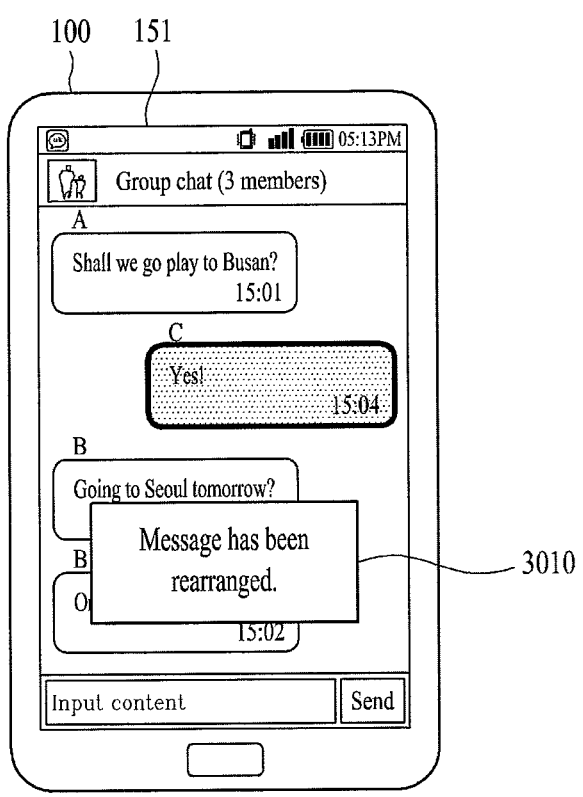
FIG. 9 is a diagram illustrating one example of a method of indicating that a message has been rearranged.

Next, FIG. 9 is a diagram illustrating one example of a method of indicating that a message has been rearranged. Referring to FIG. 9, if a second message is rearranged, the controller 180 can display a first indication screen 3010, which indicates that the second message has been rearranged, on the touchscreen 151.

In this instance, the first indication screen may include a text indicating that the message has been rearranged. To this end, the first indication screen may include a content of the second message. In addition, the first indication screen may be configured in various ways. For instance, referring to FIG. 9, the first indication screen may include a popup window 3010 created on the touchscreen. In another instance, the first indication screen may include a screen representing both a figure of a first message and a shape of the second message, and more particularly, a screen semi-transparently displayed on the touchscreen 151 by overlapping a screen currently displayed on the touchscreen.

When the second message is rearranged, i.e., when the second message displayed by being previously transmitted is displayed by being shifted ahead of the first message, the first indication screen can be displayed. Alternatively, the first indication screen can be displayed when a newly input second message is displayed ahead of the first message. Alternatively, the first indication screen can be displayed in both a user's mobile terminal (cf. reference number 100 shown in FIG. 5B) giving a command for rearranging the second message and a counterpart's terminal (cf. reference number 101 shown in FIG. 5B) receiving the message rearrangement command.

In the following description, various examples of a detailed method of editing order of displaying a message on a chat window screen are explained with reference to FIGS. 10 to 15.

Figure 10:
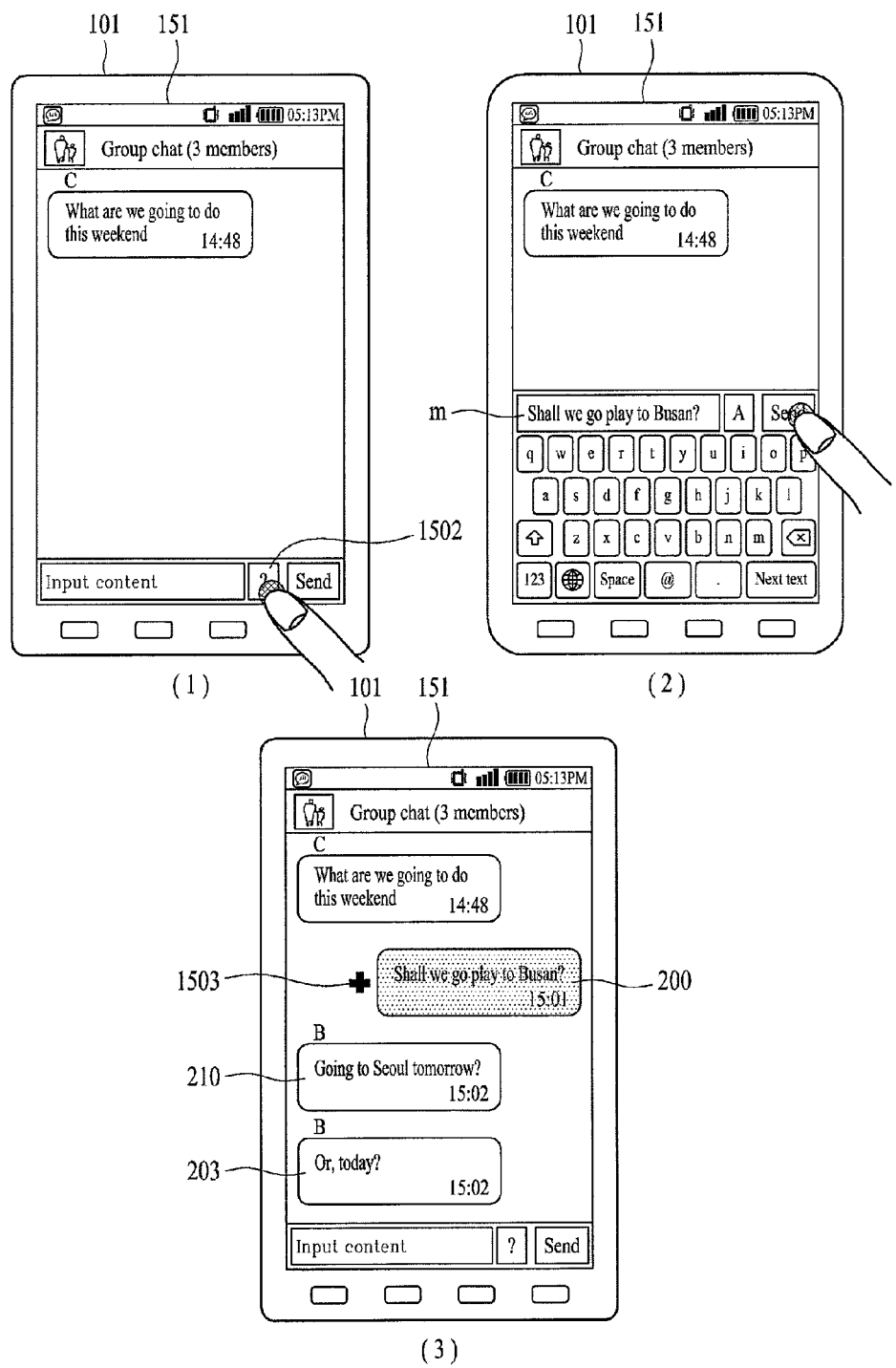
FIG. 10 is a diagram illustrating one example of a method of inputting a reference message.
Figure 11A:
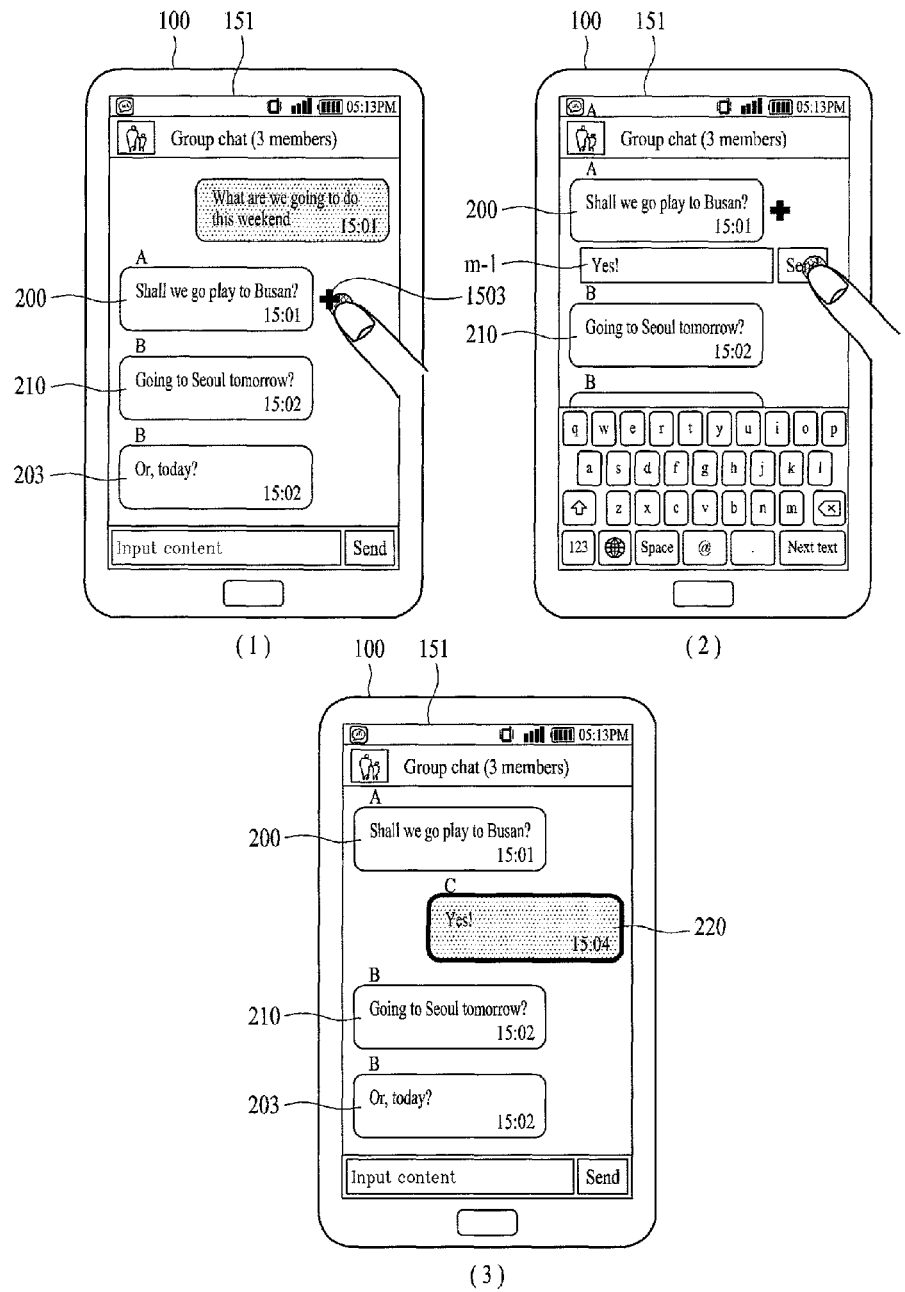
FIG. 11A and FIG. 11B are diagrams illustrating examples of a method of rearranging messages as a message specifically related to a reference message is recognized as a first message.
Figure 11B:
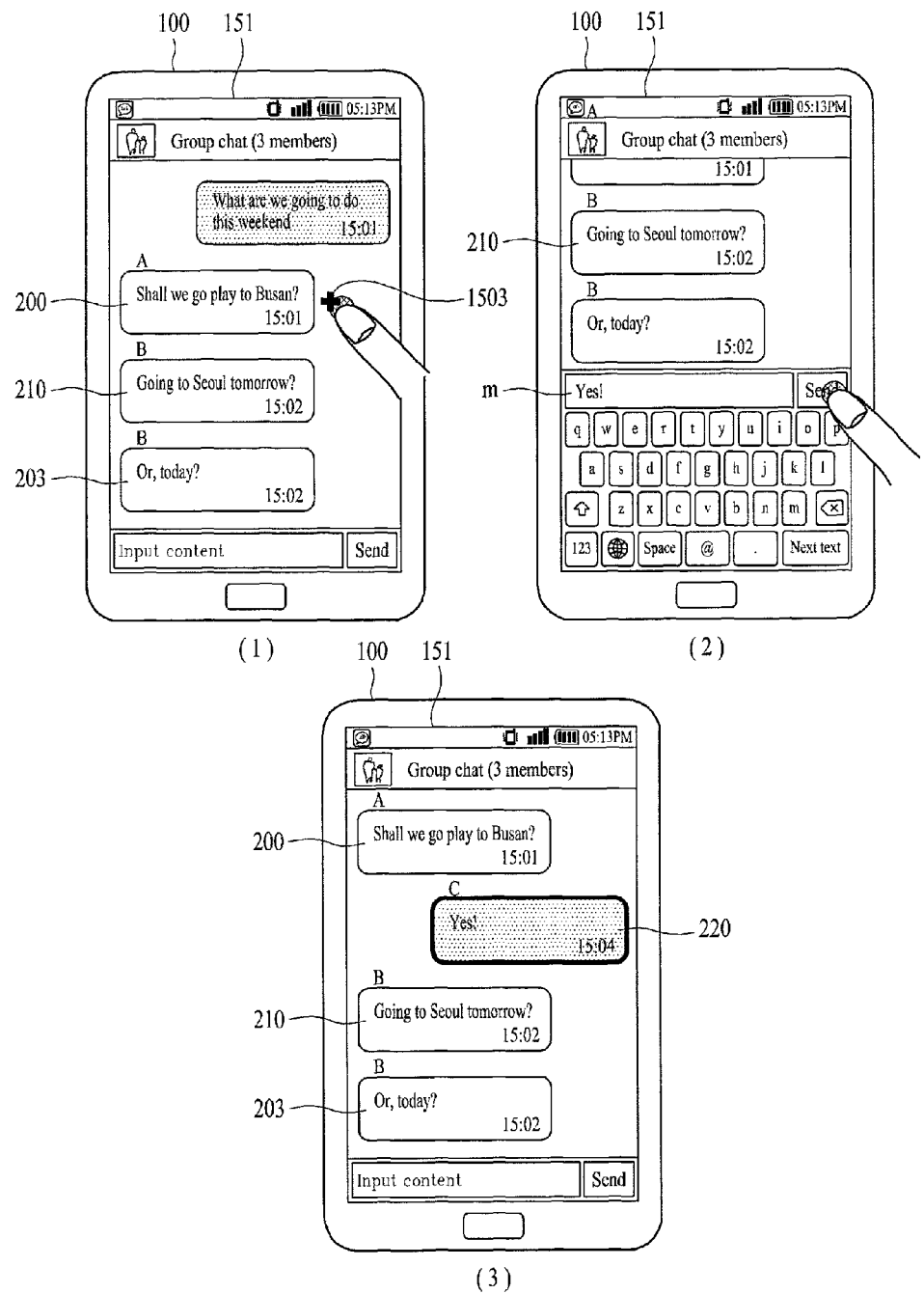

In particular, FIG. 10 is a diagram illustrating one example of a method of inputting a reference message in a mobile terminal, and FIGS. 11A and 11B are diagrams illustrating examples of a method of rearranging messages as a message specifically related to the reference message input in the above manner is recognized as a first message.

According to one embodiment, a controller can recognize a message, which is displayed right after a messages designated as a reference message by a user, as a first message. In doing so, when a message rearrangement command is input, the controller 180 can display a second message by being rearranged between the reference message and the first message.

The reference message may include a message designated as the reference message by a user among message displayed on a touchscreen by being previously transceived. In this instance, the controller 180 can recognize a message, which is transmitted by being input right after a touch input applied to a second icon, as the reference message.

Alternatively, the reference message may include a message selected as the reference message by a user among messages displayed on the touchscreen by being previously transceived. Alternatively, the reference message may include a message containing a specific word, a specific sentence or a specific sentence symbol among messages displayed on the touchscreen by being previously transceived.

When a reference message is designated, a message displayed right behind the reference message may be automatically designated as a first message. Hence, the reference message may include a most recently transceived message among messages transceived before the first message is transceived. A user can indirectly designate the first message previously transceived by designating the reference message.

The reference message may be designated irrespective of a sender of the first message. Preferably, a sender of the reference message and a sender of the second message are different from each other. In particular, the reference message preferably includes a message, which is designated as the reference message and transmitted by a counterpart.

As a reference message is designated, a first message is selected. If a message rearrangement command for a second message is input, the controller 180 rearranges the second message between the reference message and the first message. In particular, the second message can be displayed by being rearranged ahead of the first message and after the reference message. In this instance, the second message may include a message selected by a user from a plurality of messages displayed by being previously transceived or a newly input message.

According to the present embodiment, a user can rearrange messages in modified order so that a second message can be displayed right after a specific message (e.g., a reference message). As a result, a method of editing the order of messages can be further extended. If a reference message contains a question that requires an answer and if a second message contains the answer for the question, the present invention can be efficiently used.

In particular, a counterpart can send a reference message to a user of the mobile terminal 100 through a job shown in FIG. 10. Referring to FIG. 10 (1), a chat window can be displayed on the terminal 101 of a counterpart. In addition, a second icon 1502 can be displayed nearby a message input field together.

Referring to FIG. 10 (2), right after applying a touch input to the second icon 1502, the counterpart inputs a new message to a message input field m and can then send the new message. In this instance, since the new message is sent right after touching the second icon 1502, the new message can be designated as a reference message.

Referring to FIG. 10 (3), the reference message can be displayed together with a third icon 1503 within the chat window. In this instance, the third icon 1503 can inform a user that a message 200 nearby the third icon 1503 has been designated as the reference message. In addition, the third icon 1503 may be displayed together with the reference message 200 in the terminal having received the reference message 200.

After the counterpart has sent the reference message 200, other messages 210 and 203 may be further transceived and displayed on the terminal 101 of the counterpart. Among the displayed messages, the controller of the counterpart terminal 100 recognizes a message right behind the reference message 200 as a first message 210.

If the counterpart sends the reference message through the above-described job, the user of the mobile terminal 100 can rearrange a second message through a job shown in FIG. 11A or 11B. Referring to FIG. 11A (1) or 11B (1), if the reference message 200 is received from the counterpart, the third icon 1503 can be displayed together with the reference message 200.

As the reference message 200 is received, the controller 180 of the mobile terminal 100 of the user can recognize a message 210, which is displayed transceived right after the reference message 200, as a first message. While the controller recognizes the first message 210, referring to FIG. 11A (1) or FIG. 11B (1), the user can touch the third icon 1503 for an input of a second message.

According to one embodiment, referring to FIG. 11A (2), if the touch input to the third icon 1503 is detected, the controller 180 can display an auxiliary input field m-1 between the reference message 200 and the first message 210. In this instance, the touch input to the third icon 1503 may be performed as a touch input for displaying the auxiliary input field. Referring to FIG. 11A (2), the user can send a new message by inputting the new message to the auxiliary input field m-1. In doing so, the controller 180 can recognize the message, which is transmitted by being input to the auxiliary input field m-1, as a second message. Moreover, the controller 180 can recognize a transmission command for transmitting the new message as a rearrangement command for rearranging the second message.

According to another embodiment, referring to FIG. 11B (2), even if a touch input to the third icon 1503 is detected, the controller 180 does not display an auxiliary input field. Instead, the controller 180 can recognize the message, which is transmitted by being input to the message input field m right after applying the touch input, as a second message. Referring to FIG. 11B (2), if the user transmits a new message by inputting the new message to the message input field m right after touching the third icon 1503, the controller 180 recognizes the new message as a second message and can also recognize a transmission command for transmitting the new message as a rearrangement command for rearranging the second message.

Thus, if the user of the mobile terminal 100 inputs the second message and then sends the second message, referring to FIG. 11A (3) or FIG. 11B (3), the second message can be displayed by being rearranged. The controller 180 can display the newly transmitted message 220 (i.e., the second message) by being rearranged between the reference message 200 and the first message 210. As a result, the second message 220 can be displayed right after the message 200 designated as the reference message by the counterpart. In addition, the counterpart can specify the order of rearrangement of the second message by setting the reference message.

Next, FIG. 12 is a diagram illustrating one example of a method of inputting a second message where a plurality of messages are designated as reference messages. According to one embodiment, if there are a plurality of reference messages, the controller 180 can recognize a message, which is displayed right after a message selected by a user from a plurality of the reference messages, as a first message. In particular, when a second message is rearranged, the second message can be displayed right after or behind the message selected by the user from a plurality of the reference messages.

The controller displays a fourth icon on a touchscreen of a mobile terminal. As a touch input is performed on the fourth icon, the controller 180 can display a plurality of the reference messages continuously displayed together. In doing so, the fourth icon can inform the user that a plurality of the reference messages exist.

When a plurality of messages are designated as reference messages, respectively, senders of a plurality of the reference messages may be identical to or different from each other. A plurality of the reference messages can be transceived continuously or discontinuously. In the latter case, at least one different message may be transceived between two reference messages. Each of a plurality of the reference messages can be displayed together with a third icon. In particular, as the third icon is displayed nearby each of a plurality of the reference messages, it can indicate that the nearby messages are designated as the reference message.

When a message displayed by being transceived right after one reference message is a different reference message, the controller recognizes the different reference message as a first message. In this instance, if a message rearrangement command for a second message is input, the second message can be displayed by being rearranged between the one reference message and the different reference message.

In particular, referring to FIG. 12 (1), a second reference message 200b and a plurality of messages 202 and 203 transceived after transmission/reception of the second reference message 200b are displayed on the mobile terminal 100 of a user. In addition, a fourth icon 1504 indicating that a plurality of reference messages exist is also displayed. The user can perform a touch input on the fourth icon 1504 as shown in FIG. 12 (1).

When the touch input to the fourth icon 1504 is detected, referring to FIG. 12 (2), the controller 180 can continuously display a plurality of reference messages 200a and 200b together. In this instance, the plurality of the reference messages include the a reference message 200a and the second reference message 200b. In particular, the first reference message 200a may include a message, which is designated as a reference message, among the messages transceived ahead of the second reference message 200b. Referring to FIG. 12 (2), the second reference message 200b may include a message sent by A, while the first reference message 200a may include a message sent by B.

The controller 180 can display the first reference message 200a and the second reference message 200b on a bottom or top end of the touchscreen. In addition, the controller display a popup window including contents of the first reference message 200a and the second reference message 200b. Alternatively, the controller 180 can display the first and second reference messages 200a and 200b by being processed into semitransparency and overlapping other messages. Referring to FIG. 12 (2), the user can touch and select the first reference message 200a from the displayed first and second reference messages 200a and 200b.

According to one embodiment, the controller 180 can automatically scroll a chat window screen so the selected reference message 200a is displayed on the touchscreen. Referring to FIG. 12 (3), the controller 180 can scroll up the chat window screen until the first reference message 200a is displayed. In addition, the controller 180 can recognize the selected reference message, i.e., a message 210 displayed by being transceived right after the first reference message 200a, as a first message.

Referring to FIG. 12 (3), a reference message selected from a plurality of the reference messages can be displayed by being discriminated from other messages. For instance, an outline of the first reference message 200a can be highlighted. The first reference message 200a may be displayed together with the third icon 1503 like the second reference message 200b. Referring to FIG. 12 (3), the user can touch the third icon 1503 in order to input a second message.

If the touch input to the third icon is detected, referring to FIG. 12 (4), the controller 180 can display an auxiliary input field m−1 between the first reference message 200a and a first message 210. If the user inputs a new message to the auxiliary input field m−1 and then sends the new message, the controller 180 can recognize the message transmitted by being input to the auxiliary input field m−1 as a second message. Subsequently, the controller transmits the second message and can display the second message by being rearranged between the first reference message 200a and the first message 210.

Figure 14:
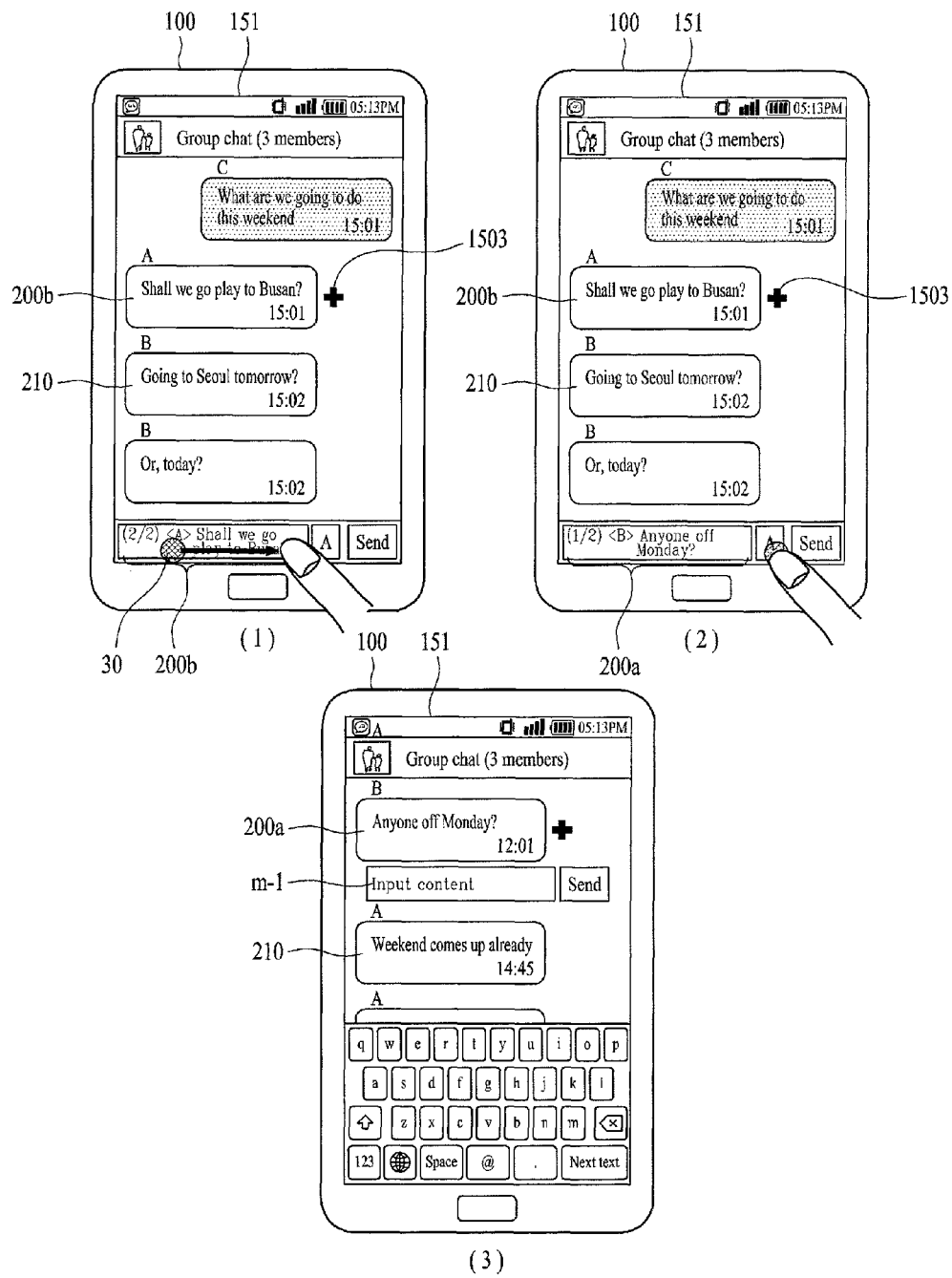
FIG. 14 is a diagram illustrating one example of a method of displaying another one of the at least one or more reference messages on the touchscreen according to the embodiment shown in FIG. 13.

Next, FIG. 13 is a diagram illustrating one example of a method of displaying one of at least one or more reference messages on a touchscreen. FIG. 14 is a diagram illustrating one example of a method of displaying another one of the at least one or more reference messages on the touchscreen according to the embodiment shown in FIG. 13.

According to one embodiment, the controller 180 can display a content of a reference message within a message input field. In doing so, the content of the reference message can be displayed semi-transparently within the message input field. In addition, a sender of the reference message can be displayed within the message input field together with the content of the reference message.

When a plurality of reference messages exist, the controller 180 can display a content of one of a plurality of the reference messages on the message input field. In doing so, the total number of the reference messages and the order of the reference messages displayed on the message input field can be displayed within the message input field together with the content of the reference message.

While a content of a specific one of a plurality of the reference messages is displayed on the message input field, if a first icon is touched, the controller 180 can display a message, which is transmitted by being input right after touching the first icon, by being rearranged right behind the specific reference message. To this end, the controller 180 can recognize a message, which is displayed right behind a former message used to be displayed on the message input field among a plurality of the reference messages when a user touches the first icon, as a first message.

According to the present embodiment, a user can conveniently check a content of a previously input reference message. Moreover, even if a plurality of reference messages exist, the user can intuitively recognize that a newly input message will be rearranged right behind which one of a plurality of the reference messages.

In particular, referring to FIG. 13 (1), a content of a specific reference message 200b can be displayed on a message input field m. FIG. 13 (1) shows that the specific reference message 200b is displayed on a chat window together. Yet, if the number of transceived messages increases later, even if the specific reference message 200 disappears from a screen, the content of the reference message 200b can be maintained in the message input field m.

Thus, while the content of the specific reference message 200b is displayed, if a touch input is performed on the first icon 1501, the controller 180 can recognize a message, which is displayed right behind the reference message 200b displayed on the message input field m, as a first message 210. In addition, referring to FIG. 13 (2), the controller 180 can display an auxiliary input field m−1 between the reference message 200b and the first message 210. A user inputs a new message to the auxiliary input field m−1, thereby enabling the new message to be displayed by being rearranged between the reference message 200b and the first message 210.

On the other hand, the reference message 200b displayed on the message input field m may include one of a plurality of reference messages in FIG. 13 (1). For instance, the message displayed on the message input field m may include a second reference message 200b. In addition, there may exist a first reference message 200a transceived ahead of the second reference message 200b.

According to one embodiment, referring to FIG. 14 (1), a user may apply a touch drag input 30, which is performed along a length direction of a message input field m, to the message input field m. If the touch drag input is detected, referring to FIG. 14 (2), a controller can change a content of a reference message displayed on the message input field m into a content of a first reference message 200a. As the first reference message 200a is transceived ahead of other messages displayed on a chat window screen shown in FIG. 14 (2), it may not be displayed on the chat window screen shown in FIG. 14 (2).

While the reference message displayed on the message input field m is changed into the first reference message 200a, if a touch input is applied to a first icon, referring to FIG. 14 (3), the controller 180 recognizes a message displayed right behind the first reference message 200a as a first message 210 and can then display an auxiliary input field m−1 between the first reference message 200a and the first message 210. The user inputs a new message to the auxiliary input field m−1, thereby enabling the new message to be displayed by being rearranged between the first reference message 200a and the first message 210.

Moreover, referring to FIG. 14 (3), the controller 180 can automatically scroll the chat window screen so that the first reference message 200a can be displayed on the chat window screen. In doing so, as the chat window screen is changed in response to a user's action of touching the first icon 1501, the user may view the first reference message 200a.

Next, FIG. 15 is a diagram illustrating another example of a method of displaying one of at least one or more reference messages on a touchscreen. According to one embodiment, a controller can display a second indication screen containing a content of a reference message to be displayed. In doing so, the second indication screen may be displayed by overlapping a chat window screen displayed on a touchscreen. For instance, the second indication screen may be displayed as a popup window. In another instance, the second indication screen may include a semitransparent screen displayed by overlapping the chat window screen.

In particular, referring to FIG. 15 (1), a second indication screen 3020 containing a content of a specific reference message 200a can be displayed on one side of a chat window screen. In this instance, the second indication screen 3020 may be configured semi-transparently. In addition, the second indication screen can keep being displayed until a new message is input as a second message by touching a first icon.

While the second indication screen 3020 is displayed, if a touch input is applied to the first icon, a controller can display a new message input right behind by being rearranged right behind a reference message 200a included in the second indication screen 3020. To this end, referring to FIG. 15 (2), the controller recognizes a message displayed right behind the reference message 200a as a first message

210 and can then display an auxiliary input field m-1 between the reference message 200a and the first message 210.

According to one embodiment of the present invention, a questionnaire and statistics function between users exchanging messages with each other on a chat window screen can be further provided. In the following description, an operation of a mobile terminal according to the present embodiment is explained in detail with reference to FIG. 16A and FIG. 16B.

Figure 16A:
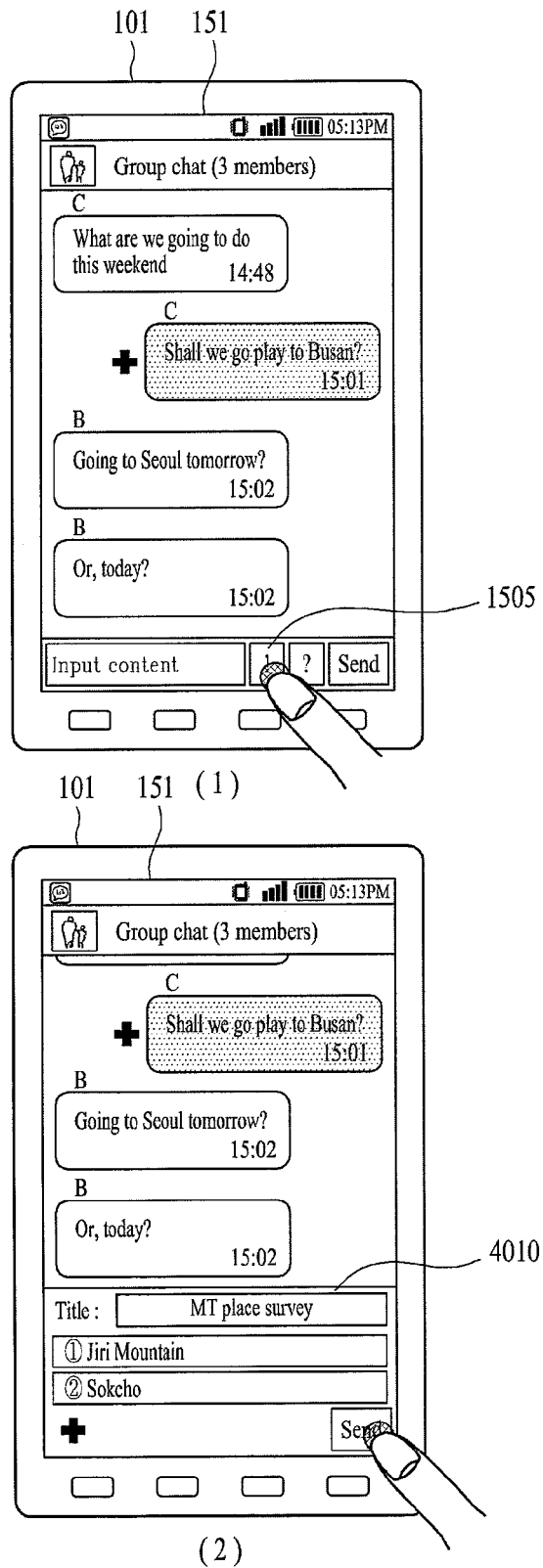

Next, FIGS. 16A and 16B are diagrams illustrating one example of providing a questionnaire and statistics function through a question message and an answer message. According to the present embodiment, a controller can further display a questionnaire, which is included in an input or received question message. Moreover, if an answer message in response to the question message is transceived, the controller 180 can display the statistics of the questionnaire based on the transceived answer message.

The question message can be transmitted by being designated as the question message by a sender. For instance, the question message can be transmitted together with a tag informing the controller that the corresponding message is the question message. In addition, a tile of the corresponding questionnaire, questions and at least one or more examples can be contained in the question message. Moreover, a creator of the question message can modify the number and contents of the examples.

The answer message can be transmitted by being designated as the answer message by a sender as well. If a message designated as the answer message is input or received, the controller 180 can search the answer message for a specific keyword. In addition, the controller 180 can compile statistics on the number of answer messages containing the same keyword.

When at least one or more examples are contained in the question message, if a user selects one example from the at least one or more examples, an answer message can be transmitted. A content of the selected example is contained in the answer message. In addition, the controller 180 can compile statistics on the number of the answer messages containing the same example.

In particular, referring to FIG. 16A (1), a user can send a question message by touching a fifth icon 1505. In this instance, the fifth icon 1505 can be displayed nearby a message input field. In addition, the fifth icon 1505 can be displayed by being discriminated from a first icon for inputting a second message.

If the fifth icon 1505 is touched, referring to FIG. 16A (2), a controller can display a question message screen 4010 to be displayed. In this instance, the question message screen 4010 may include an input field for inputting a title of a questionnaire and an input field for inputting at least one example. After a title and examples have been input, as shown in FIG. 16A (2), if an icon 'send' is touched, a message containing the questionnaire can be transmitted as a question message.

Once the question message is input or received, referring to FIG. 16B (1), a sixth icon 1506 can be displayed on a touchscreen. In this instance, the sixth icon 1506 indicates that a previously input or received question message exists. In response to a touch input applied to the sixth icon 1506, referring to FIG. 16B (2), the controller can display a question message screen 4020 to be displayed.

Referring to FIG. 16B (2), if the question message screen 4020 is displayed, a user can select one of the examples contained in the question message screen 4020. For instance, the user can select the example 'Sokcho'. Thus, if one of the examples is selected, the controller 180 can control an answer message containing the selected example to be automatically transmitted.

If answer messages are transmitted from all users who transceive messages with each other on a chat window, the controller 180 can compile statistics on the questionnaire based on a plurality of the transmitted answer messages. In particular, the controller 180 can compile statistics on the number of the examples contained in each of the answer messages. Once the compilation of the statistics is complete, referring to FIG. 16B (3), the controller 180 can display a statistic screen 4030 to be displayed. Moreover, the controller 180 can output an intermediate statistic screen by compiling statistics each time each of the answer messages is input or received.

In the following description, configurations of a mobile terminal and server for implementing the aforementioned embodiments are explained in detail with reference to FIG. 17 and FIG. 18. In particular, FIG. 17 is a block diagram of the mobile terminal 100 according to one embodiment of the present invention.

Figure 17:
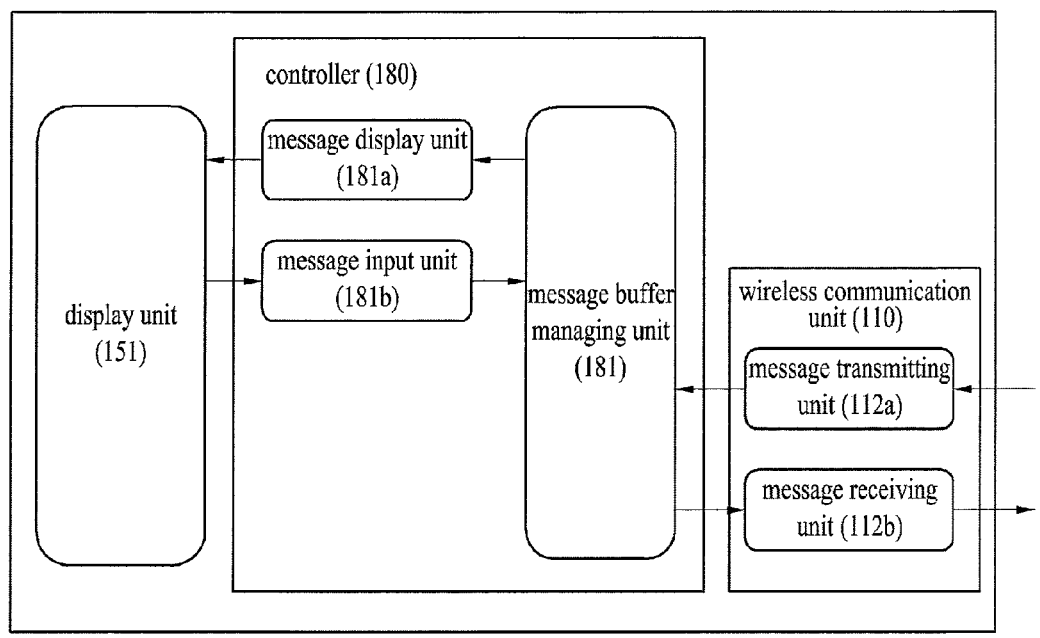
FIG. 17 is a block diagram of a mobile terminal according to one embodiment of the present invention.

Referring to FIG. 17, the mobile terminal 100 may include a wireless communication unit 110, a display unit 151 and a controller 180. In particular, the wireless communication unit 110 may include a message receiving unit 112a and a message transmitting unit 112b. The controller 180 can include a message display unit 181a, a message input unit 181b and a message buffer managing unit 181.

The message receiving unit 112a receives a message from another mobile terminal or a message transceiving server. Having received the message, the message receiving unit 112a converts the received message to a data format used by the message buffer managing unit 181 and can then deliver it to the message buffer managing unit 181.

On the other hand, the message input unit 181b converts such a data, which is input as a message in the display unit 151, as a text, an image and the like to a data format used by the message buffer managing unit 181 and can then deliver it to the message buffer managing unit 181. In addition, the message input unit 181b can forward a message rearrangement command input through the display unit 151 to the message buffer managing unit 181.

The message buffer managing unit 181 can determine whether to perform a rearrangement by receiving an input of a message from the message input unit 181b. If the message rearrangement command is delivered together with the message, the message buffer managing unit 181 analyzes the message rearrangement command and can then change a consecutive number given to each message in accordance with the message rearrangement command.

In this instance, the consecutive number is the number that indicates the order of each displayed message. In addition, the consecutive number can be basically given to each message in order of message transmission/reception. In particular, the message buffer managing unit 181 changes consecutive numbers of a first message and other messages transceived behind the first message into the backward order and can give a consecutive number, of which order is ahead of that of the first message, to a second message.

The message buffer managing unit 181 can deliver the messages having the changed consecutive numbers to the message display unit 181a. The message display unit 181a analyzes the delivered message as a message a user will actually view and can then display the messages in order of consecutive number of message.

The message buffer managing unit 181 can forward the message rearrangement command delivered from the message input unit to the message transmitting unit 112b. The message transmitting unit 112b transmits the message rearrangement command to another mobile terminal or a message transceiving server.

Figure 18:
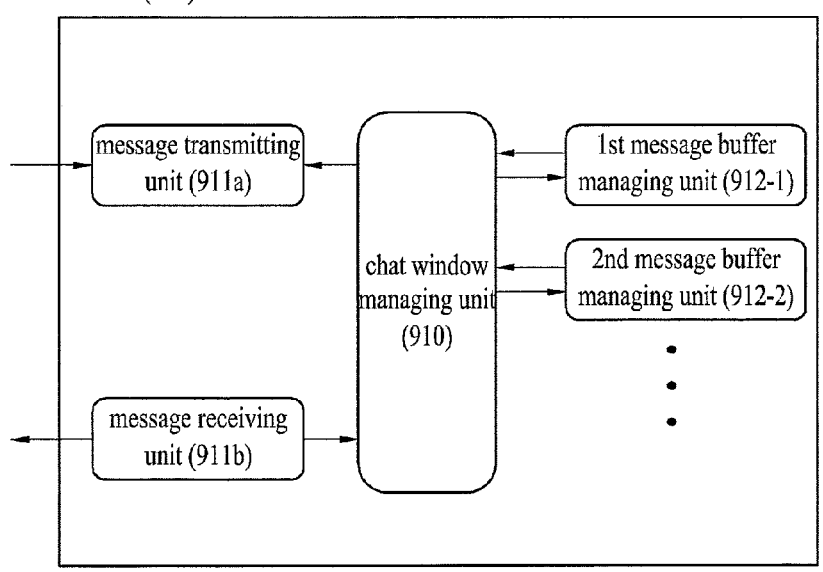
FIG. 18 is a block diagram of a message transceiving server according to one embodiment of the present invention.

FIG. 18 is a block diagram of a message transceiving server 900 according to one embodiment of the present invention. Referring to FIG. 18, a message transceiving server 900 can deliver a plurality of messages between a first mobile terminal and a second mobile terminal and may include a message receiving unit 911a configured to receive a control signal from the first mobile terminal and a message transmitting unit 911b configured to transmit a message rearrangement command, which is given to enable a plurality of the messages to be displayed on the second mobile terminal by being rearranged in order different from that of transceived time of the messages, to the second mobile terminal.

Moreover, the message transceiving server 900 may include a chat window managing unit 910, a first message buffer managing unit 912-1, a second message buffer managing unit 912-2, and the like. Each of the message buffer managing units controls mobile terminals that share at least one chat window with each other and can store messages transceived between the mobile terminals. In the present description, the first mobile terminal and the second mobile terminal can be controlled through the first message buffer managing unit 912-1.

The message receiving unit 911a converts a message transmitted by the first mobile terminal to a data format used by the message buffer managing unit and can then deliver it to the chat window managing unit 910. In addition, the message receiving unit 911a receives a message rearrangement command from the first mobile terminal and can then deliver it to the chat window managing unit 910.

The chat window managing unit 910 sorts the messages delivered from the message receiving unit 911a in order to deliver them to a message buffer managing unit to which the first mobile terminal belongs and can then deliver the sorted messages to the corresponding message buffer managing unit. According to the present example, the message transmitted from the first mobile terminal can be delivered to the first message buffer managing unit 912-1. In addition, the chat window managing unit 910 can deliver a message rearrangement command to the first message buffer managing unit 912-1.

Based on the delivered message rearrangement command, the first message buffer managing unit 912-1 can change the consecutive numbers of the messages saved in the course of transceiving the messages between the first mobile terminal and the second mobile terminal. Since the description of the consecutive numbers is identical to the former description, it will be omitted from the following description.

After the first message buffer managing unit 912-1 has changed the consecutive numbers of the messages, the first message buffer managing unit 912-1 delivers the message and the message rearrangement command, which are transmitted by the first mobile terminal, to the chat window managing unit 910 again. Subsequently, the chat window managing unit 910 can deliver the message and the message rearrangement command to the message transmitting unit 911b. In addition, the message transmitting unit 911b can transmit a message rearrangement command to the second mobile terminal together with the delivered message.

According to another embodiment of the present invention, if at least one first message, which requires a user's answer among messages input by a counterpart in a chat window mentioned in the foregoing description of one embodiment of the present invention, is received, a method for a controller 180 to display a second message to correspond to a location having a specific first message displayed thereat without user's additional manipulation by recognizing a corresponding situation on inputting/transmitting the second message corresponding to an answer to each of the received at least one message (i.e., a method of changing an arrangement location) is proposed. Of course, although the message does not require an answer explicitly, if a message having a content matching a content of the corresponding message is input by a user, the controller 180 determines the corresponding message as a first message and can then determine and change an arrangement location of a second message input by the user.

Figure 19:
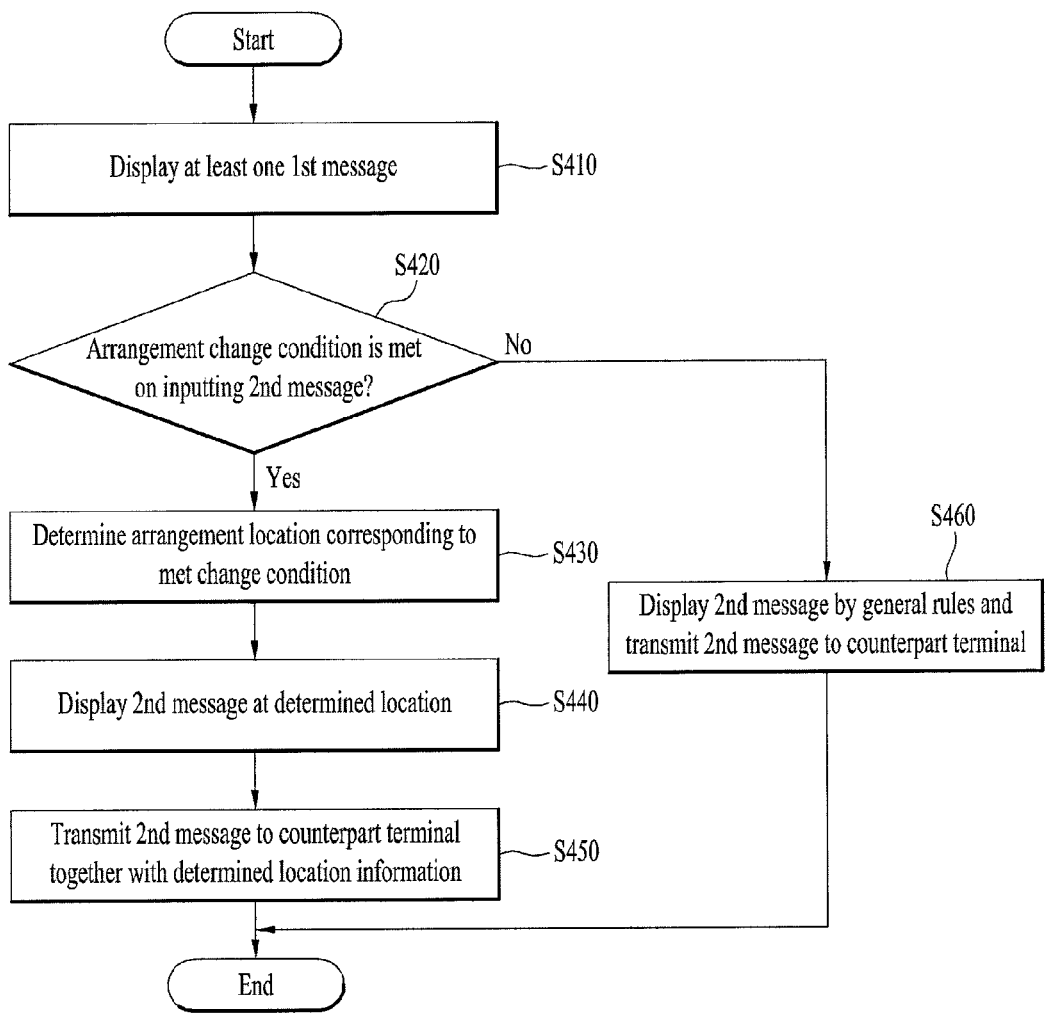
FIG. 19 is a flowchart for a method of controlling a mobile terminal according to one embodiment of the present invention.

FIG. 19 is a flowchart illustrating a method of controlling a mobile terminal according to one embodiment of the present invention. Referring to FIG. 19, a wireless communication unit receives at least one first message from a specific counterpart in order of reception. In addition, a controller can display the received at least one first message in order of reception time (S410).

In doing so, if a second message is input by a user, the controller 180 can determine whether a preset arrangement change condition is met (S420). In this instance, the preset arrangement change condition may mean the condition for determining whether one of previously received first messages matches a second message input by the user and may include a user's message rearrangement command input, an automatic rearrangement depending on determination of a first message and a second message in accordance with a situation recognition of the controller 180, and the like. Moreover, the situation recognition of the controller 180 includes determining a first message matching a second message in consideration of a timing point of inputting a second message for a first message, association of a second message with a content of a first message, etc.

The controller 180 can determine an arrangement location of the second message on a chat window to correspond to the condition met by the second message among the preset arrangement change conditions (S430). Hence, the controller 180 can display the second message at the determined arrangement location (S440).

Moreover, the controller 180 can deliver the second message to a terminal of a counterpart currently participating in the chat window together with information on the determined arrangement location. In doing so, the information of the arrangement location and the second message may be delivered to the terminal of the counterpart through a specific server that manages and relays information on the corresponding chat window.

On the contrary, if the arrangement change condition is not met (i.e., if the first message matching the second message is not determined), the controller 180 displays the second message on the chat window by general rules and can then transmit the second message to the terminal of the counterpart (S460). In this instance, the general rules may mean that a message is displayed in one direction in order of transmission/reception time. More particularly, the general rules may mean that the second message is displayed right below a message last displayed at a message input/transmitted timing point.

Figure 20:
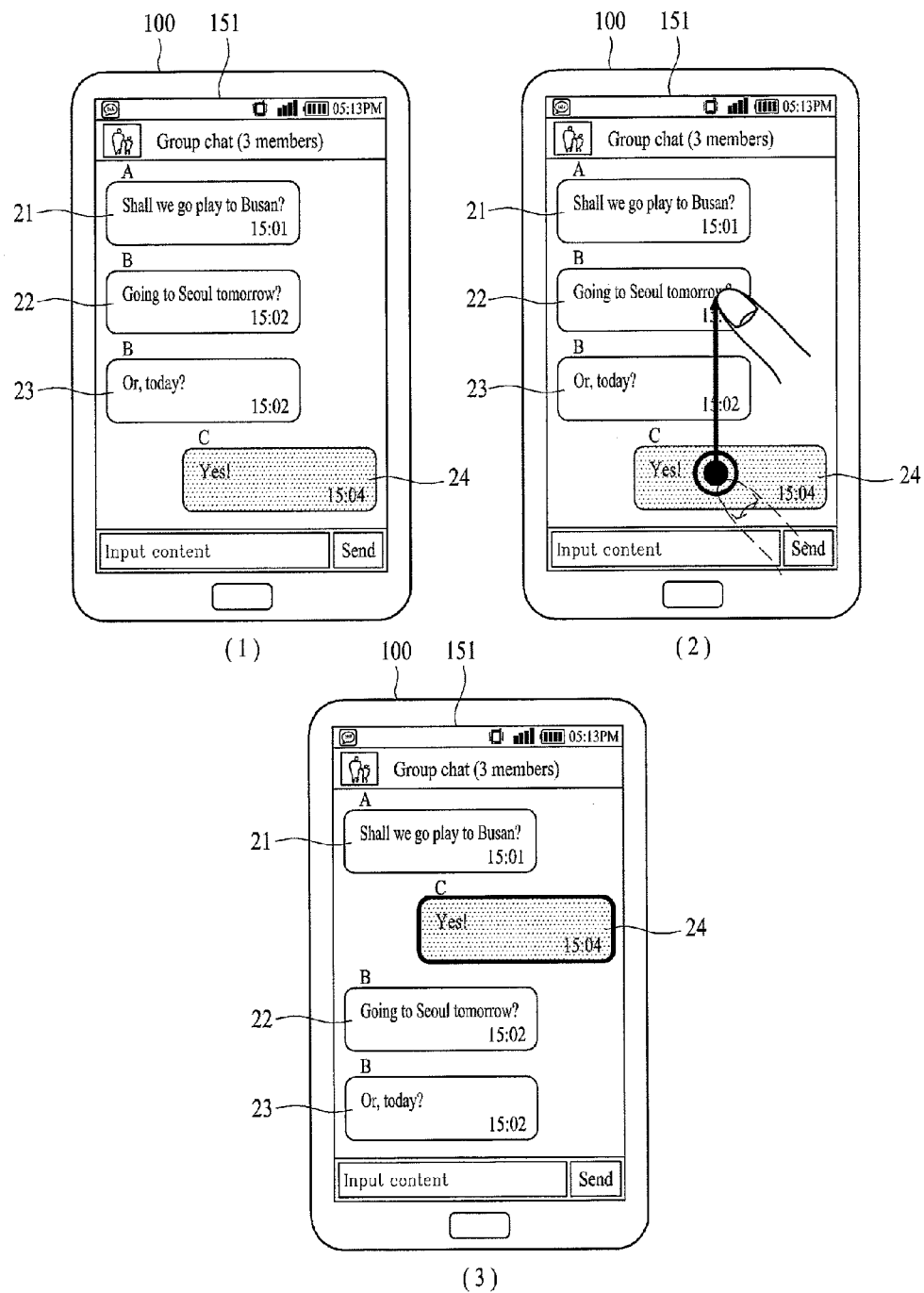
FIG. 20 is a diagram illustrating one example of an operating method of a mobile terminal if a user inputs a message rearrangement command to the mobile terminal according to one embodiment of the present invention.

For inputting a rearrangement command for a user to directly change a location of a second message is described with reference to FIG. 20 as follows. FIG. 20 is a diagram illustrating one example of an operating method of a mobile terminal if a user inputs a message rearrangement command to the mobile terminal according to one embodiment of the present invention.

In particular, referring to FIG. 20 (1), a plurality of messages 21 to 24 respectively sent by A, B and a user C of a mobile terminal are displayed on the touchscreen 151 of the mobile terminal 100 of the user. In doing so, the messages 21 to 24 are displayed in order of transmission time.

Referring to FIG. 20 (2), while the transceived messages 21 to 24 are displayed within a chat window in order of transmission, the user can long touch the message 24. Subsequently, the user can continuously apply a touch drag input. In doing so, the user can end the touch drag input on another message 22. In response to the continuous long touch and touch drag input, a controller recognizes the long touch input applied message 24 as a second message and can recognize the message 22, which overlaps the end point of the touch drag input, as a first message.

Thus, while both of the first message and the second message are displayed, a message rearrangement command for the second message can be input. In doing so, the message rearrangement command may be input by the user through the touchscreen. In this instance, the message rearrangement command may include a touch input of a specific pattern. Alternatively, the message rearrangement command may be received from outside of the mobile terminal. The message rearrangement command may be delivered from one of the terminals of the at least one or more specific counterparts or from a message server.

When the message rearrangement command is input, the controller 180 can display the second message by rearranging the second message to be situated ahead of the first message. In particular, the second message displayed behind the first message can be displayed by being displayed ahead of the first message. As a result, the order of the messages displayed on the touchscreen of the mobile terminal can be modified.

For instance, the controller 180 can recognize an action, which is performed by long touching one of the messages displayed on the touchscreen and then continuously applying a touch drag input, as the message rearrangement command. As mentioned in the foregoing description, the continuous long touch and touch drag input may be handled as a user command for specifying the first message and the second message. In this instance, using a single touch input, the user can select a message (e.g., second message) to rearrange and a location (e.g., a location of the first message) for rearranging the selected message and then give the message rearrangement command.

In particular, the controller 180 can recognize the long touch and touch drag input shown in FIG. 20 (2) as the rearrangement command. In response to this command, referring to FIG. 20 (3), the controller 180 can rearrange the second message 24 so the selected second message 24 is displayed behind the first message 22. Thus, the second message 24 is displayed behind the first message 22 even though the second message 24 was transmitted after the first message 22.

Referring to FIG. 20 (3), if the order of the displayed message is modified by the message rearrangement command, the controller 180 can discriminately display the rearranged message 24. For instance, referring to FIG. 20 (3), the controller 180 can control the touchscreen to display a highlighted outline of the second message 24.

Moreover, when the message rearrangement command is input, the controller 180 can control the wireless communication unit to transmit a command for rearranging the second message to the terminal of the at least one specific counterpart. In doing so, the wireless communication unit can directly transmit the message rearrangement command to the terminal of the counterpart or may transmit the message rearrangement command to the message server. When the message rearrangement command is transmitted to the message server, the message server can transmit the message rearrangement command to the terminal of the counterpart.

In this instance, the message rearrangement command can control the terminal of the counterpart so that the second message can be displayed by being rearranged behind the first message in the terminal of the counterpart. In particular, as the message rearrangement command is received, a controller of the terminal of the at least one specific counterpart rearranges the second message to be located behind the first message and can then control the messages to be displayed in order of the rearrangement. As a result, the messages displayed on the terminal of the counterpart can be displayed in modified order as well.

In the following description, when there are a plurality of first messages, each of which requires a user's answer, a process for determining an arrangement location of a second message input by a user is explained with reference to FIG. 21.

Figure 21:
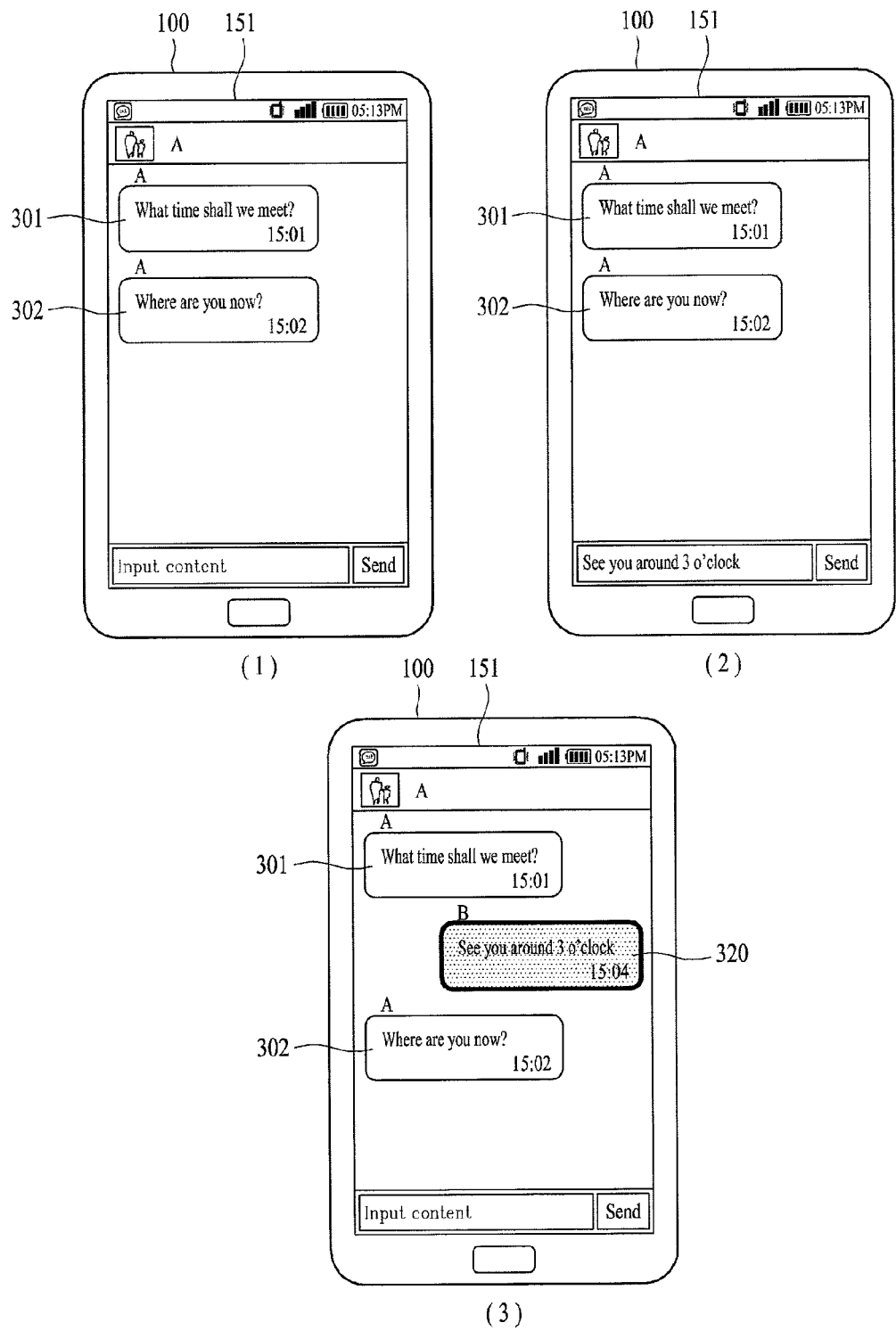
FIG. 21 is a diagram illustrating one example of a process for determining an arrangement location of a message input after reception of a plurality of question messages in a mobile terminal according to one embodiment of the present invention.

FIG. 21 is a diagram illustrating one example of a process for determining an arrangement location of a message input after reception of a plurality of question messages in a mobile terminal according to one embodiment of the present invention. In this instance, assume that a preset arrangement change condition corresponds to when a plurality of question messages are consecutively received. In addition, in FIG. 21, assume that a chat window for a terminal user B to exchange messages with a counterpart A is displayed on a touchscreen.

Referring to FIG. 21 (1), after a first question message 301 has been received from a counterpart, before a user B sends an answer message in response to the first question message 301, a second question message 302 may be received. In doing so, if a user inputs a message, as shown in FIG. 21 (2), the controller 180 detects a question mark from each of messages received before the user's message input and can then determine that the corresponding message is the message (i.e., first message) that requires a user's answer.

Hence, the controller 180 detects that information (i.e., 3 o'clock) related to a time is included in the message input by the user, determines that the corresponding message is an answer (i.e., second message) to the first message 301, and can then display the corresponding message above the second message 302 despite being input later than the second message 302, as shown in FIG. 21 (3). If a user input answer contains a word related to a place, the corresponding answer message may be displayed below the second message 302.

Figure 22:
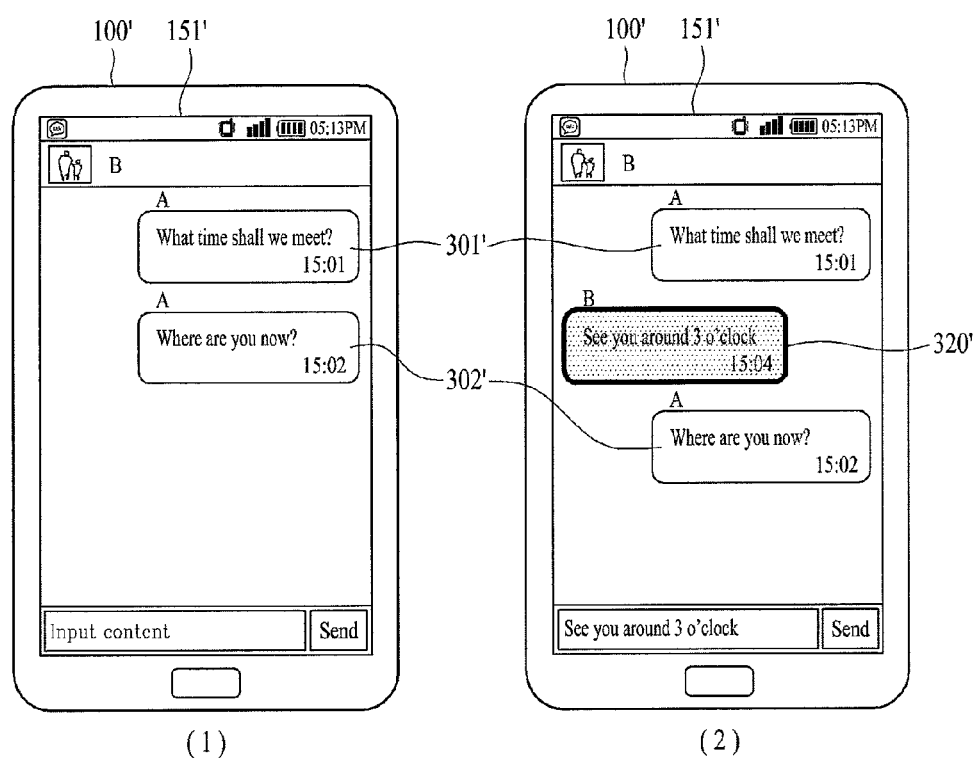
FIG. 22 is a diagram illustrating one example of a process for performing the former process shown in FIG. 21 on a terminal of a counterpart.

Meanwhile, the situation shown in FIG. 21 may be represented by a terminal of a counterpart A as shown in FIG. 22. FIG. 22 is a diagram illustrating one example of a process for performing the former process shown in FIG. 21 on a terminal of a counterpart.

Referring to FIG. 22, two messages 301' and 302' are sequentially input to a touchscreen 151' of a terminal 100' of a counterpart A (FIG. 22 (1)). In doing so, if a user B inputs an answer message in response to the first message 301', an answer message 320' may be displayed between the first message 301' and the second message 302' on the touchscreen 151' of the terminal 100' of the counterpart A (FIG.

22 (2)). This is because information on an arrangement location is received by the terminal 100' of the counterpart A as well as a second message.

Figure 23:
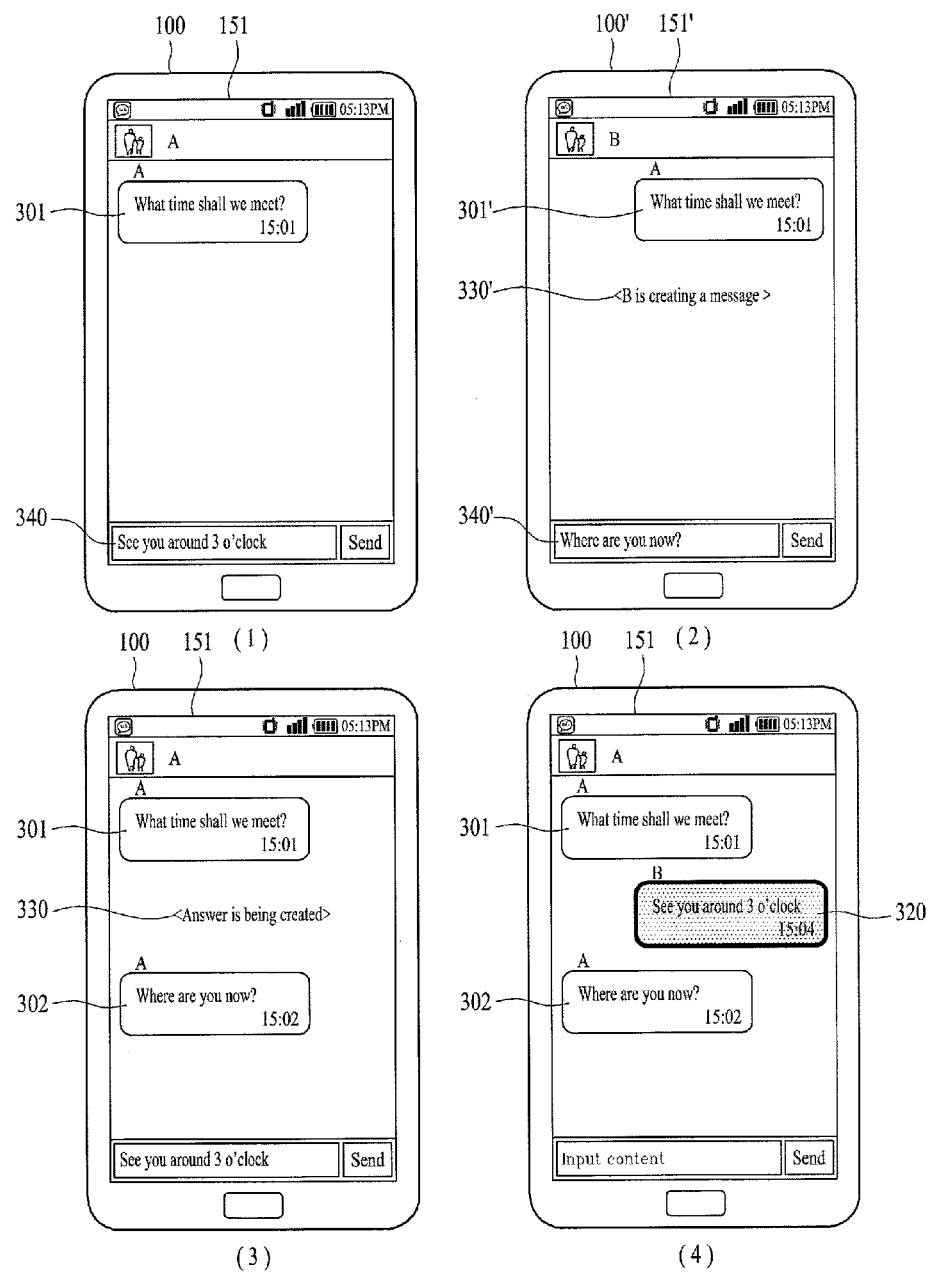
FIG. 23 is a diagram illustrating one example of a process for determining an arrangement location of an answer message if another message is received while creating the answer message in a mobile terminal according to one embodiment of the present invention.

In the following description, receiving a different message while inputting an answer to an early arriving message is explained with reference to FIGS. 23 and 24. FIG. 23 is a diagram illustrating one example of a process for determining an arrangement location of an answer message if another message is received while creating the answer message in a mobile terminal according to one embodiment of the present invention.

Referring to FIG. 23 (1), as a message 301 is received from a counterpart A, the corresponding message is displayed on a chat window displayed on the touchscreen 151 of the mobile terminal 100. In doing so, if a user of the mobile terminal 100 inputs an answer message in response to the received message 301 through a message input window 340, the controller 180 transmits a signal indicating that the message creation is in progress to the counterpart mobile terminal (or a server when using the server) until the answer message is transmitted.

Hence, referring to FIG. 23 (2), information 330' indicating that a user B is creating an answer message can be displayed below a first message 301' on a touchscreen 151' of the counterpart mobile terminal 100'. Of course, referring to FIG. 23 (3), the information 330 indicating that the user B is creating the answer message can be displayed on the touchscreen 151 of the user. In doing so, if the counterpart A inputs a second question through a message input window 340' and then sends the second question, referring to FIG. 23 (3), a second question message 302 can be displayed below the information 330 indicating that the user B is creating the answer message.

Thereafter, if the user inputs a transmission command for the created message, the controller 180 determines whether the corresponding message is the answer to the first message 301. If it is determined that the corresponding message is the answer to the first message 301, the controller 180 can transmit an arrangement location information, which enables the answer message to be displayed at a location where the information 330 indicating that the answer message is being created, to the counterpart terminal. Hence, referring to FIG. 23 (4), the information 330 indicating that the answer message is being created can be replaced by the answer message 320.

When each message is relayed by a server, in order to perform the above-mentioned process, the server assigns a message #2 to the information indicating that an answer is being created and then processes it into a temporary message. If the answer is input, the server inserts a content of an answer message in the temporary message and then changes it into a normal message. In particular, a message #1 is assigned to the first question message 301 and a message #3 may be assigned to the second question message 302.

If a user stops creating the answer and deletes all contents of the input window 340, the server can delete a history of a message #2. Thereafter, if the user inputs a message again, the server can assign a message #4 to the input message. Of course, if the arrangement location information is delivered from the mobile terminal 100 together, the server can assign an appropriate message number in accordance with the arrangement location information. This case is described in detail with reference to FIG. 24 as follows.

Figure 24:
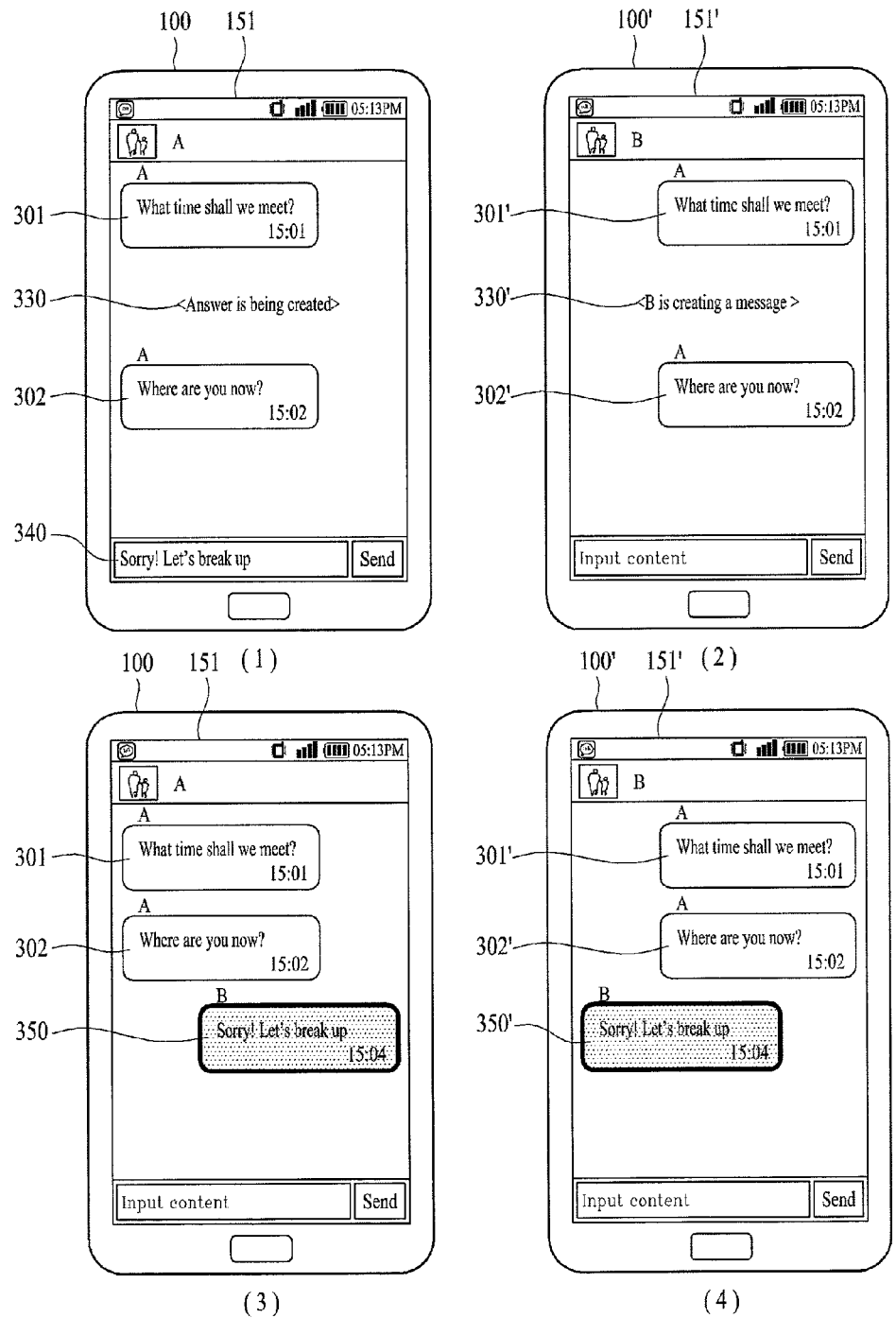
FIG. 24 is a diagram illustrating another example of a process for determining an arrangement location of an answer message if another message is received while creating the answer message in a mobile terminal according to one embodiment of the present invention.

FIG. 24 is a diagram illustrating another example of a process for determining an arrangement location of an answer message if another message is received while creating the answer message in a mobile terminal according to one embodiment of the present invention.

Referring to FIG. 24 (1), this situation is similar to that shown in FIG. 23 (3). However, a message input to an input window 340 by a user is not related to any one of two received messages 301 and 302. In addition, referring to FIG. 24 (2), information 330' indicating that an answer is being created can be displayed on a touchscreen of a counterpart terminal.

In doing so, when a transmission command for transmitting the message created in the message window 340 is input, if the controller 180 determines that a text of the created message is not related to the two previously received messages, the controller 180 can transmit the created message to the counterpart terminal without arrangement location information. Hence, referring to FIG. 24 (3), the information 330 indicating that the answer is being created disappears from the chat window displayed on the touchscreen 151 and a message 350 created by the user can be displayed next to the previously received messages.

In addition, referring to FIG. 24 (4), the information 330' indicating that the answer is being created disappears from the counterpart terminal and the message 350' created by the user is displayed next to the previously sent message. Of course, the present function may be implemented by a user's explicit command input. For instance, after the input window has been touched twice, if a message is input, the controller 180 may skip the arrangement location information irrespective of a content of the message.

In FIGS. 21 to 24, the controller 180 determines a first message by detecting a question mark, by which the present invention is non-limited. Although the symbol is omitted, a first message requiring an answer can be determined by determining a presence or non-presence of an interrogative (e.g., when, where, why, etc.), a presence or non-presence of an imperative sentence or other contexts.

In the following description, a method for a user to select a first message, which will correspond to a second message, through a scroll is explained in detail with reference to FIG. 25. FIG. 25 is a diagram illustrating one example of a method of determining a location, at which a message to be transmitted will be arranged, through a scroll in a mobile terminal according to one embodiment of the present invention.

FIG. 25 (1) assumes a situation similar to that of FIG. 21 (1). In this instance, if a user scrolls down a chat window through a touch input using a pointer 400, referring to FIG. 25 (2), a message designation indicator 310 can be displayed in the middle of a chat window. The user can scroll a message in order for a message, for which an answer will be created, to be located within the message designation indicator 310. For instance, when attempting to transmit an answer message in response to a first message 301, the user can scroll the chat window in a manner shown in FIG. 25 (3).

After the user has input a message, if the message is sent, the controller 180 creates an arrangement location information for enabling the transmitted message to be displayed next to the first message and can then transmit the corresponding message to a counterpart terminal. Hence, referring to FIG. 25 (4), the created message 320 can be displayed between the first message 301 and the second message 302. Moreover, the present function can be implemented so the message designation indicator can move to correspond to user's eyes by recognizing the user's eyes using a camera 121 instead of using the scroll. In this instance, the message designation indicator can be displayed if a user inputs a specific command (e.g., a long touch to a chat window, etc.) or it is determined that a plurality of messages requiring answers are received.

Meanwhile, according to another example of the present embodiment, the present function can be applied to when the controller 180 recommends an answer to be transmitted by obtaining a context of a received message. This is described in detail with reference to FIG. 26 as follows.

FIG. 26 is a diagram illustrating one example of applying an answer recommendation function in a mobile terminal according to another example of another embodiment of the present invention. Referring to FIG. 26 (1), as a message 306 is received from a counterpart, the controller 180 obtains a context of the received message and can then search the memory 160 or an external environment (e.g., internet, cloud service, etc.) for information that can become an answer requested by the counterpart.

A corresponding recommended answer 510 may be displayed on a bottom of a chat window. In doing so, if a user selects 'x', the recommended answer 510 may disappear from the chat window. If a region except 'x' is selected from the recommended answer, the recommended answer can be transmitted as a message. In this situation, referring to FIG. 26 (2), if a second message 307 requiring a user's answer is received, the controller 180 searches for a recommended answer 520 to the second messages and can then display the recommended answer 520 on the chat window. In doing so, if the user selects the first recommended answer 510, referring to FIG. 26 (3), a message 390 corresponding to the recommended answer can be displayed between the first message 306 and the second message 307.

Moreover, according to another embodiment of the present invention, a user can display a message, which can be edited by another counterpart participating in a chat, on a chat window. This is described with reference to FIG. 27 as follows.

FIG. 27 is a diagram illustrating one example of a function executable through a message, which can be edited by all chat participants, in a mobile terminal according to one embodiment of the present invention. Referring to FIG. 27 (1), total 3 members including a user C and two counterparts A and B participate in a group chat within a chat window. Currently, 3 messages 601 to 603 are received from the two counterparts. Yet, assume that more messages have been transceived previously. In doing so, if the user applies a touch input (e.g., a long touch, etc.) of a specific pattern to an empty region of the chat window, referring to FIG. 27 (2), a message window 610 can be created. In this instance, information on a user, who created the message window, can be displayed on the message window 610 as well.

In this situation, referring to FIG. 27 (3), the counterpart B selects a message window 610' displayed on a touchscreen 151' of the mobile terminal 100' of the counterpart B and can then input an answer message. Hence, referring to FIG. 27 (4), the message window 610 displayed on a screen of the user C can be replaced by a message 620 input by the counterpart B. Moreover, when a keyword included in the replaced message 620 is included in a previously displayed message, prescribed visual effects 631 and 632 can be given to the respective keywords within the corresponding message. Therefore, the above-described method may be especially useful in determining previous chat contents at a glance if a message is not input to the chat window over prescribed duration or the chat window is not checked over prescribed duration.

Meanwhile, configurations of the mobile terminal and server for implementing another embodiment of the present invention may be similar to those shown in FIG. 17 and FIG. 18, of which redundant description shall be omitted for clarity.

Accordingly, the present invention provides the following advantages. First of all, according to at least one of embodiments of the present invention, a user enables a specific message to be displayed ahead of a previous message, which is displayed on a chat window screen by being transceived ahead of the specific message, on the chat window screen configured for at least one specific counterpart. In addition, the user can control the specific message to be displayed ahead of the previous message on a screen of a terminal of the at least one specific counterpart with whom messages are transceived in case of the above-mentioned message rearrangement. Therefore, the user can recognize chat contents at a glance by modifying the order of message in accordance with a content of a message, whereby convenience in using the mobile terminal can be enhanced.

Secondly, a controller can display a specific message to be displayed ahead of a previous message, which is displayed on a chat window screen by being transceived ahead of the specific message, on the chat window screen configured for at least one specific counterpart in accordance with a prescribed reference or in response to a user's selection. In addition, the user can control the specific message to be displayed ahead of the previous message on a screen of a terminal of the at least one specific counterpart with whom messages are transceived in case of the above-mentioned message rearrangement. Therefore, the user can recognize chat contents at a glance by modifying the order of message in accordance with a content of a message, whereby convenience in using the mobile terminal can be enhanced.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a wireless communication unit configured to transceive messages with at least one counterpart terminal;
a touchscreen configured to display the messages transceived with the at least one counterpart terminal in a transceived order; and
a controller configured to:
receive a selection of a first message displayed, on the touchscreen of the mobile terminal, at a first position among the messages transceived with the at least one counterpart terminal,
move the selected first message to a different position on the touchscreen of the mobile terminal such that the transceived messages are displayed, on the touchscreen of the mobile terminal, in a non-transceived order, and
transmit a message rearrangement command from the mobile terminal to the at least one counterpart terminal for rearranging the messages transceived with the at least one counterpart terminal displayed on a touchscreen of the at least one counterpart terminal in the non-transceived order, wherein both the transmission of the message rearrangement command to the at least one counter terminal and the displaying of the transceived messages in the non-transceived order on the touchscreen of the mobile terminal occur based on the move of the selected first message to the different position on the touchscreen of the mobile terminal.

2. The mobile terminal of claim 1, wherein the first message is from a user of the mobile terminal.

3. The mobile terminal of claim 1, wherein the selection of the first message includes a touch and drag of the first message to the different position.

4. The mobile terminal of claim 1, wherein the controller is further configured to highlight the moved first message.

5. The mobile terminal of claim 1, wherein the controller is further configured to:
receive an input of a new message,
display the received new message at a position immediately after or before the selected first message, and
transmit the message rearrangement command to the at least one other counterpart terminal for displaying the received new message at the position immediately after or before a corresponding first message displayed on the touchscreen of at least one counterpart terminal.

6. The mobile terminal of claim 1, wherein the controller is further configured to:
receive a pinching out touch and drag including the first message and a second message immediately next to the first message,
display an auxiliary input field between the first and second messages based on the received pinching out touch and drag,
receive an input of a new message in the auxiliary input field, and
display the received new message between the first and second messages.

7. The mobile terminal of claim 1, wherein the controller is further configured to display a first indication indicating that the selected first message has been moved to the different position.

8. The mobile terminal of claim 1, wherein the controller is further configured to set at least one of the messages as a reference message and determine a message following the reference message as a next message.

9. The mobile terminal of claim 8, wherein when the message rearrangement command is input, the controller is further configured to:
receive an input of a new message, and
display the new message between the reference message and the next message following the reference message.

10. The mobile terminal of claim 9, wherein the controller is further configured to display an icon indication next to the reference message to notify a user about the reference message, and
wherein the new message is input after selection of the icon indication.

11. The mobile terminal of claim 8, wherein the reference message is a message received from the at least one counterpart terminal.

12. The mobile terminal of claim 8, wherein when the reference message includes a plurality of reference messages, the controller is further configured to determine a message following a corresponding selected reference message as the next message.

13. The mobile terminal of claim 12, wherein the controller is further configured to arrange and display the plurality of reference messages next to each other.

14. The mobile terminal of claim 1, wherein the controller is further configured to:
display a scroll window on the touchscreen in response to a predetermined scroll window input command,
scroll the displayed messages through the scroll window in response to a scrolling command,
receive an input of a new message, and
display the new message at a location below a corresponding message displayed within the scroll window.

15. The mobile terminal of claim 1, wherein the controller is further configured to:
examine contents of a message received from the at least one counterpart terminal, and
display a recommended answer to the received message based on a search of a memory associated with the mobile terminal.

16. The mobile terminal of claim 1, wherein the controller is further configured to:
display the received messages within a chat window corresponding to the at least one counterpart terminal, and
move the selected first message to the different position within the same chat window corresponding to the at least one counterpart terminal.

17. The mobile terminal of claim 16, wherein the messages displayed within the chat window before moving the first message are the same as the messages displayed within the chat window after moving the first message, while a display order of the messages within the chat window before moving the first message is different from that of the messages within the chat window after moving the first message.

18. A mobile terminal comprising:
a wireless communication unit configured to transceive messages with at least one counterpart terminal;
a touchscreen configured to display the messages transceived with the at least one counterpart terminal in a transceived order; and
a controller configured to:
receive a selection of a first message displayed at a first position among the messages transceived with the at least one counterpart terminal,
move the selected first message to a different position on the touchscreen such that the transceived messages are displayed in a non-transceived order, and
transmit a message rearrangement command to the at least one counterpart terminal for rearranging messages displayed on a touchscreen of the at least one counterpart terminal in the non-transceived order,
wherein the controller is further configured to:
set a message to be a questionnaire message including a plurality of selectable items, transmit the questionnaire message to the at least one counterpart terminal,
receive an answer message from the at least one counterpart terminal including a selection of at least one of the plurality of selectable items, and
display results including the selection of at least one of the plurality of selectable items on the touchscreen.

19. A mobile terminal comprising:
a wireless communication unit configured to transceive messages with at least one counterpart terminal;
a touchscreen configured to display the messages transceived with the at least one counterpart terminal in a transceived order; and a controller configured to:
receive a selection of a first message displayed at a first position among the messages transceived with the at least one counterpart terminal,
move the selected first message to a different position on the touchscreen such that the transceived messages are displayed in a non-transceived order, and
transmit a message rearrangement command to the at least one counterpart terminal for rearranging messages displayed on a touchscreen of the at least one counterpart terminal in the non-transceived order,
wherein the controller is further configured to:
receive an input of a new message, and
display the new message at a location after either one of the two other messages depending on a comparison of contents of the new message with at least two other messages displayed on the touchscreen.

20. The mobile terminal of claim 19, wherein the comparison is made using at least one of a presence or non-presence of a specific sentence symbol, a presence or non-presence of an interrogative and a text recognition included in the new message and the at least two other messages.

21. A mobile terminal comprising:
a wireless communication unit configured to transceive messages with at least one counterpart terminal;
a touchscreen configured to display the messages transceived with the at least one counterpart terminal in a transceived order; and
a controller configured to:
receive a selection of a first message displayed at a first position among the messages transceived with the at least one counterpart terminal,
move the selected first message to a different position on the touchscreen such that the transceived messages are displayed in a non-transceived order, and
transmit a message rearrangement command to the at least one counterpart terminal for rearranging messages displayed on a touchscreen of the at least one counterpart terminal in the non-transceived order,
wherein the controller is further configured to:
receive an input of a new message, and
display the new message at a location after either one of the two other messages depending on a comparison of a timing of the new message with timings of at least two other messages displayed on the touchscreen.

22. A method of controlling a mobile terminal, the method comprising:
transceiving, via a wireless communication unit of the mobile terminal, messages with at least one counterpart terminal;
displaying, via a touchscreen of the mobile terminal, the messages transceived with the at least one counterpart terminal in a transceived order;
receiving, via a controller of the mobile terminal, a selection of a first message displayed, on the touchscreen of the mobile terminal, at a first position among the messages transceived with the at least one counterpart terminal;
moving, via the controller of the mobile terminal, the selected first message to a different position on the touchscreen of the mobile terminal such that the transceived messages are displayed, on the touch screen of the mobile terminal, in a non-transceived order, and
transmitting from the mobile terminal, via the wireless communication unit of the mobile terminal, a message rearrangement command to the at least one counterpart terminal for rearranging the messages transceived with the at least one counterpart terminal displayed on a touchscreen of the at least one other counterpart terminal in the non-transceived order,
wherein both the transmitting of the message rearrangement command to the at least one counter terminal and the displaying the transceived message in the non-transceived order on the touchscreen of the mobile terminal occur based on the moving of the selected first message to the different position on the touch screen of the mobile terminal.

23. The method of claim 22, further comprising:
displaying the received messages within a chat window corresponding to the at least one counterpart terminal; and
moving the selected first message to the different position within the same chat window corresponding to the at least one counterpart terminal.

24. The method of claim 23, wherein the messages displayed within the chat window before moving the first message are the same as the messages displayed within the chat window after moving the first message, while arrangement of the messages within the chat window before moving the first message is different from that of the messages within the chat window after moving the first message.

* * * * *